(12) United States Patent
Jamison et al.

(10) Patent No.: US 10,982,524 B2
(45) Date of Patent: Apr. 20, 2021

(54) ENHANCING DRILLING OPERATIONS WITH COGNITIVE COMPUTING

(71) Applicant: HALLIBURTON ENERGY SERVICES, INC., Houston, TX (US)

(72) Inventors: Dale E. Jamison, Humble, TX (US); Robert Lynn Williams, Spring, TX (US); Amir Bar, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 388 days.

(21) Appl. No.: 15/754,729

(22) PCT Filed: Oct. 30, 2015

(86) PCT No.: PCT/US2015/058458
§ 371 (c)(1),
(2) Date: Feb. 23, 2018

(87) PCT Pub. No.: WO2017/074456
PCT Pub. Date: May 4, 2017

(65) Prior Publication Data
US 2018/0238164 A1 Aug. 23, 2018

(51) Int. Cl.
E21B 44/00 (2006.01)
G05B 13/02 (2006.01)
(Continued)

(52) U.S. Cl.
CPC .............. *E21B 44/00* (2013.01); *E21B 21/08* (2013.01); *E21B 44/04* (2013.01); *E21B 44/06* (2013.01);
(Continued)

(58) Field of Classification Search
CPC ............................ E21B 44/00; E21B 2200/22
See application file for complete search history.

(56) References Cited

U.S. PATENT DOCUMENTS

2002/0120401 A1* 8/2002 Macdonald ........... E21B 44/005
702/6
2008/0262810 A1 10/2008 Moran et al.
(Continued)

FOREIGN PATENT DOCUMENTS

WO 2015123591 A1 8/2015

OTHER PUBLICATIONS

International Search Report and Written Opinion; PCT Application No. PCT/US2015/058458; dated Oct. 30, 2015.
(Continued)

Primary Examiner — Tara Schimpf
(74) Attorney, Agent, or Firm — Polsinelli PC

(57) ABSTRACT

A cognitive computing system for enhancing drilling operations, in some embodiments, comprises: neurosynaptic processing logic; and one or more information repositories accessible to the neurosynaptic processing logic, wherein the neurosynaptic processing logic performs a probabilistic analysis of one or more real-time drilling operations measurements, one or more resources obtained from said one or more information repositories, and one or more drilling operations simulations that account for said one or more real-time drilling operations measurements, wherein the neurosynaptic processing logic controls a drilling operation based at least in part on said probabilistic analysis.

20 Claims, 11 Drawing Sheets

(51) Int. Cl.
G06Q 10/10 (2012.01)
G06N 3/08 (2006.01)
E21B 21/08 (2006.01)
E21B 44/04 (2006.01)
E21B 44/06 (2006.01)
E21B 45/00 (2006.01)
G06N 3/04 (2006.01)
G06N 3/063 (2006.01)
E21B 47/13 (2012.01)
E21B 47/18 (2012.01)

(52) U.S. Cl.
CPC ............ *E21B 45/00* (2013.01); *G05B 13/027* (2013.01); *G06N 3/049* (2013.01); *G06N 3/0472* (2013.01); *G06N 3/063* (2013.01); *G06N 3/08* (2013.01); *G06N 3/088* (2013.01); *G06Q 10/10* (2013.01); *E21B 47/13* (2020.05); *E21B 47/18* (2013.01); *E21B 2200/22* (2020.05)

(56) References Cited

U.S. PATENT DOCUMENTS

| | | |
|---|---|---|
| 2009/0114445 A1 | 5/2009 | Dashevskiy |
| 2013/0318019 A1 | 11/2013 | Jamison et al. |
| 2015/0218914 A1 | 8/2015 | Marx et al. |
| 2015/0300151 A1* | 10/2015 | Mohaghegh ............ E21B 47/10 702/9 |

OTHER PUBLICATIONS

Office Action; Canadian Application No. 2,997,713; dated Nov. 6, 2019.

* cited by examiner

US 10,982,524 B2

ENHANCING DRILLING OPERATIONS WITH COGNITIVE COMPUTING

CROSS-REFERENCE TO RELATED APPLICATIONS

This application is a national stage entry of PCT/US2015/058458 filed Oct. 30, 2015, said application is expressly incorporated herein in its entirety.

BACKGROUND

Computer scientists and engineers have long tried to create computers that mimic the mammalian brain. Such efforts have met with limited success. While the brain contains a vast, complex and efficient network of neurons that operate in parallel and communicate with each other via dendrites, axons and synapses, virtually all computers to date employ the traditional von Neumann architecture and thus contain some variation of a basic set of components (e.g., a central processing unit, registers, a memory to store data and instructions, external mass storage, and input/output devices). Due at least in part to this relatively simple architecture, von Neumann computers are adept at performing calculations and following specific, deterministic instructions, but—in contrast to the biological brain—they are generally inefficient; they adapt poorly to new, unfamiliar and probabilistic situations; and they are unable to learn, think, and handle data that is vague, noisy, or otherwise imprecise. These shortcomings substantially limit the traditional von Neumann computer's ability to make meaningful contributions in the oil and gas industry.

BRIEF DESCRIPTION OF THE DRAWINGS

Accordingly, there are disclosed in the drawings and in the following description cognitive computing systems and methods that enhance drilling operations. In the drawings.

Figure 1A:
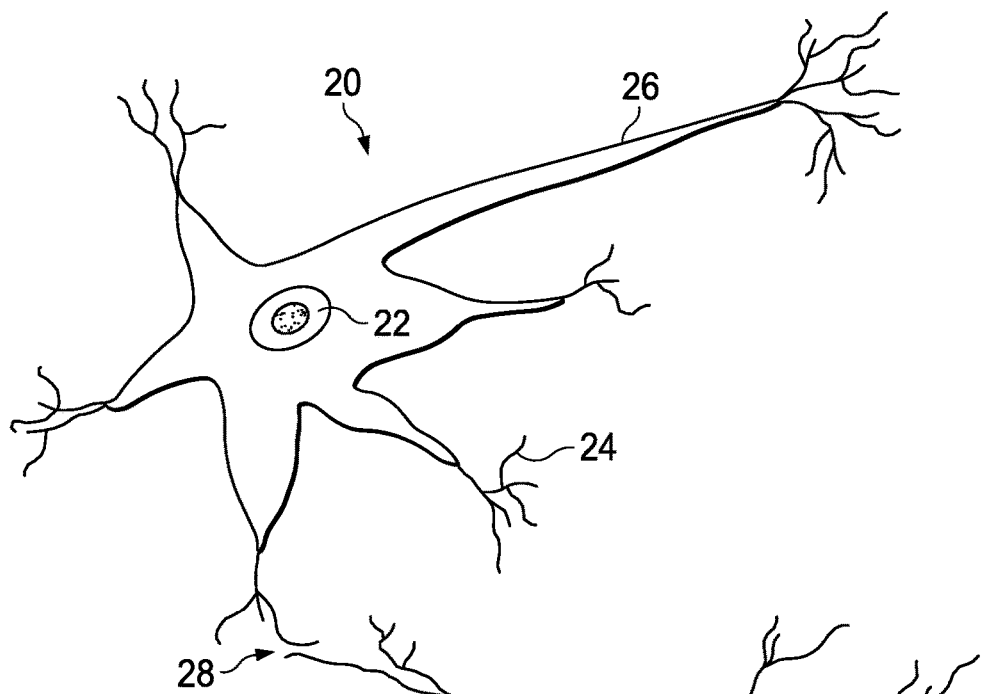
FIG. 1A is an illustration of a pair of biological neurons communicating via a synapse.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for enhancing drilling operations using cognitive computers. Cognitive computers—also known by numerous similar terms, including artificial neural networks, neuromorphic and synaptronic systems, and, in this disclosure, neurosynaptic systems—are modeled after the mammalian brain. In contrast to traditional von Neumann architectures, neurosynaptic systems include extensive networks of electronic neurons and cores operating in parallel with each other. These electronic neurons function in a manner similar to that in which biological neurons function, and they couple to electronic dendrites, axons and synapses that function like biological dendrites, axons and synapses. By modeling processing logic after the biological brain in this manner, cognitive computers unlike von Neumann machines—are able to support complex cognitive algorithms that replicate the numerous advantages of the biological brain, such as adaptability to ambiguous, unpredictable and constantly changing situations and settings; the ability to understand context (e.g., meaning, time, location, tasks, goals); and the ability to learn new concepts.

Key among these advantages is the ability to learn, because learning fundamentally drives the cognitive computer's behavior. In the cognitive computer—just as with biological neural networks—learning (e.g., Hebbian learning) occurs due to changes in the electronic neuron and synapses as a result of prior experiences (e.g., a training session with a human user) or new information. These changes, described below, affect the cognitive computer's future behavior. In a simple example, a cognitive computer robot with no prior experience or software instructions with respect to coffee preparation can be introduced to a kitchen, shown what a bag of ground coffee beans looks like, and shown how to use a coffee machine. After the robot is trained, it will be able to locate materials and make the cup of coffee on its own, without human assistance. Alternatively, the cognitive computer robot may simply be asked to make a cup of coffee without being trained to do so. The computer may access information repositories via a network connection (e.g., the Internet) and learn what a cup is, what ground coffee beans are, what they look like and where they are typically found, and how to use a coffee machine—for example, by means of a YOUTUBE® video. A cognitive computer robot that has learned to make coffee in other settings in the past may engage in a conversation with the user to ask a series of specific questions, such as to inquire about the locations of a mug, ground coffee beans, water, the coffee machine, and whether the user likes sugar and cream with his coffee. If, while preparing the coffee, a wet coffee mug slips from the robot's hand and falls to the floor, the robot may infer that a wet mug is susceptible to slipping and it may grasp a wet mug a different way the next time it brews a cup of coffee.

The marriage between neurosynaptic architecture and cognitive algorithms represents the next step beyond artificial intelligence and can prove especially useful in the oil and gas industry. This disclosure describes the use of neurosynaptic technology (and associated cognitive algorithms) to intelligently assist in optimizing drilling operations. In particular, a cognitive computer implementing neurosynaptic technology leverages access to real-time drilling data, historical data, and various other resources to generate alerts based on actual or predicted drilling events. These alerts minimize risks, lower non-productive time, maximize asset value and increase overall system performance. In tandem with such alerts, the cognitive computer may unilaterally or upon command execute one or more actions to control a drilling operation. For example, if the cognitive computer uses real-time drilling operations measurements to determine that the rate of penetration is excessive, it may communicate with equipment at the drilling site to lower the rate of penetration. The cognitive computer performs all such actions intelligently, probabilistically and with minimal or no human assistance using its neurosynaptic architecture and cognitive algorithms.

More specifically, a cognitive computer is provided with information about a particular drilling operation—for example, with a Drill Well on Paper (DWOP), which describes drilling operations in detail. The cognitive computer, being an intelligent, probabilistic machine, receives and interprets this information. In turn, it may engage in a conversation with a user or with a different cognitive computer that has provided the drilling operation information to obtain any additional information that it deems necessary or useful. The computer may have been trained to know what types of information may be necessary or useful in such situations, or it may have learned this over time on its own.

The cognitive computer that is provided with information about the drilling environment in question may also be communicably coupled to one or more computers or other equipment that control various aspects of that drilling environment. For example, the cognitive computer may communicate with a computer at the drilling site, which, in turn, controls and/or monitors some or all drilling operations. In this way, the cognitive computer has one or more contact points at the drilling site that it can use to obtain real-time information about the drilling site and to control equipment at the drilling site. In general, "real-time information" is information that is collected and relayed to the cognitive computer virtually immediately. Although the precise meaning of "real time" may vary based on the specific data collection in question, the term generally connotes a span of time on the order of milliseconds or seconds. In some embodiments, for example, "real-time information" is information that, after having been collected, is relayed to a cognitive computer within a span of five seconds.

The cognitive computer monitors drilling operations as they begin and progress. For example, the cognitive computer may monitor real-time drilling operations measurements, such as rate of drill bit penetration, drill bit revolutions per minute, weight on bit, and fluid pump rate. If the cognitive computer determines that any of these or other drilling operations measurements indicate a possible problem—for instance, a safety concern—the cognitive computer generates a drilling operations alert that is provided to a human user or to another computer, such as another cognitive computer. The cognitive computer may provide additional information with the drilling operations alert, such as suggestions regarding how to address the alert. The suggestions may be based on, e.g., a probabilistic analysis of prior such alerts, how the alerts were handled, and the ultimate outcome.

In addition to monitoring real-time drilling operations, the cognitive computer uses drilling operations measurements (i.e., any and all data collected from the drilling environment being monitored) to identify issues that might be presently occurring but that are not obvious from the drilling operations measurements, and, further, to predict issues that may arise in the future. In particular, the cognitive computer uses the drilling operations measurements in tandem with one or more types of simulations to obtain additional information about the drilling environment. These simulations may reveal information about the drilling environment that can be useful to identify potential drilling operations alerts—for instance, relating to personnel safety, environmental safety, operational efficiency, and the like. The cognitive computer intelligently and probabilistically selects specific simulations for use based on its training and learning from similar situations in the past. For example, based on prior experiences, the cognitive computer may probabilistically select one or more simulations that are most likely to yield useful information with which to generate drilling operations alerts or suggestions. The cognitive computer also intelligently and probabilistically reviews and interprets the results of the simulations and generates drilling operations alerts (if any) accordingly.

The foregoing analyses and decision-making processes are further enhanced by the cognitive computer's access to a virtually unlimited number of resources stored on information repositories that can assist the cognitive computer in performing its functions. Information repositories may vary substantially in scope and may include, without limitation, other cognitive computing systems; distributed and non-distributed databases; sources that provide real-time data pertaining to oil and gas operations; servers; personal computers; portable hard drives; thumb drives; mobile phones; smart phones; websites; or any resource available via the Internet, World Wide Web, or a local network connection. The resources accessed from such information repositories may include information that is in "natural" language, meaning, for instance, everyday language used by humans to communicate with each other that is not specifically formatted to be read by traditional von Neumann machines. Non-limiting examples of such resources include real-time data specific to the drilling environment; journals; articles; books; white papers; reports; speech; web content, etc. The cognitive computer locates and collects any and all such information that could pertain to the drilling operation being analyzed and uses it to inform its measurements, observations, simulations, predictions and alerts. When providing a drilling operations alert to a human user or other computer, the cognitive computer may also present information obtained from some or all such resources, as well as any other relevant drilling operations measurements that may have been collected, with that alert.

In addition to displaying drilling operations alerts and accompanying information, the cognitive computer may present one or more recommendations. Such recommendations may include, for instance and without limitation, ways in which drilling parameters could be modified to achieve improved drilling operations outcomes as defined by a drilling engineer. The cognitive computer generates these and other recommendations using some or all relevant information it has obtained or to which it has access and also using its probabilistic, cognitive algorithms and prior learned behavior (e.g., training by human users). The cognitive computer presents the recommendation(s) to a user or another entity (e.g., another cognitive computer or a traditional von Neumann machine) via an output interface. If multiple recommendations are presented, the cognitive computer may rank the recommendations based on a ranking algorithm. The ranking algorithm may have been programmed directly into the computer, or the computer may have been trained to use the algorithm, or some combination thereof. The cognitive computer may have automatically modified its ranking algorithm based on past user recommendation selections and subsequent outcomes so that the recommendation most likely to be selected by the user is ranked highest and is most likely to produce the best outcome for the user and for the drilling environment or operation being monitored.

In addition, the cognitive computer—without human assistance—produces arguments highlighting the advantages and disadvantages associated with each recommendation presented. These arguments are produced using the cognitive, probabilistic algorithms with which the cognitive computer is programmed or trained and using information the computer has learned in the past (e.g., facts obtained from information repositories or prior experiences). The computer may also engage in conversations with a user or other entity about the recommendations, the arguments pertaining to the recommendations, or the drilling operations environment in general. The computer may answer the user's questions, and, in some embodiments, the computer may ask the user its own questions to further refine the list of possible recommendations.

If the user approves the recommendation (or, in the case of multiple recommendations, selects one or more of the recommendations), the cognitive computer executes the recommendation(s), observes the consequences of that selection, and modifies any accessible information repositories containing resources to reflect those consequences, thereby improving the accuracy and reliability of the data in the information repositories. If the user finds the recommendation(s) unsatisfactory, the user may instruct the cognitive computer to propose a different recommendation, and the process is repeated. In some cases, the cognitive computer unilaterally performs one or more actions to address the drilling operations issue that has been identified. The foregoing description is merely illustrative of some non-limiting, potential applications of cognitive computing in the drilling operations context.

FIG. 1A is an illustration of a pair of biological neurons communicating via a synapse. Specifically, neuron 20 includes a nucleus 22, dendrites 24, an axon 26 and a synapse 28 by which it communicates with another neuron 30. The dendrites 24 serves as inputs to the neuron 20, while the axon 26 serves as an output from the neuron 20. The synapse 28 is the space between an axon of neuron 30 and a dendrite 24 of neuron 20, and it enables the neuron 30 to output information to the neuron 20 using neurotransmitters (e.g., dopamine, norepinephrine). The neuron 20 receives input from numerous neurons (not specifically shown) in addition to the neuron 30. Each of these inputs impacts the neuron 20 in different ways. Some of these neurons provide excitatory signals to the neuron 20, while other neurons provide inhibitory signals to the neuron 20. Excitatory signals push the membrane potential (i.e., the voltage difference between the neuron and the space surrounding the neuron, typically about −70 mV) toward a threshold value which, if exceeded, results in an action potential (or "spiking," which is the transmission of a pulse) of the neuron 20, and inhibitory signals pull the membrane potential of the neuron 20 away from this threshold. The repeated excitation or inhibition the neuron 20 through these different input pathways results in learning. Stated another way, if a particular input to a neuron repeatedly and persistently causes that neuron to fire, a metabolic change occurs in the synapse associated with that input axon to reduce the resistance in the synapse. This phenomenon is known as the Hebbian learning rule. In a more specific version of Hebbian learning, called spike-timing-dependent plasticity (STDP), repeated presynaptic spike arrival a few milliseconds before postsynaptic action potentials leads to long-term potentiation of that synapse, whereas repeated presynaptic spike arrival a few milliseconds after postsynaptic action potentials leads to long-term depression of the same synapse. STDP is thus a form of neuroplasticity, in which synaptic changes occur due to changes in behavior, environment, neural processes, thinking, and emotions.

Figure 1B:
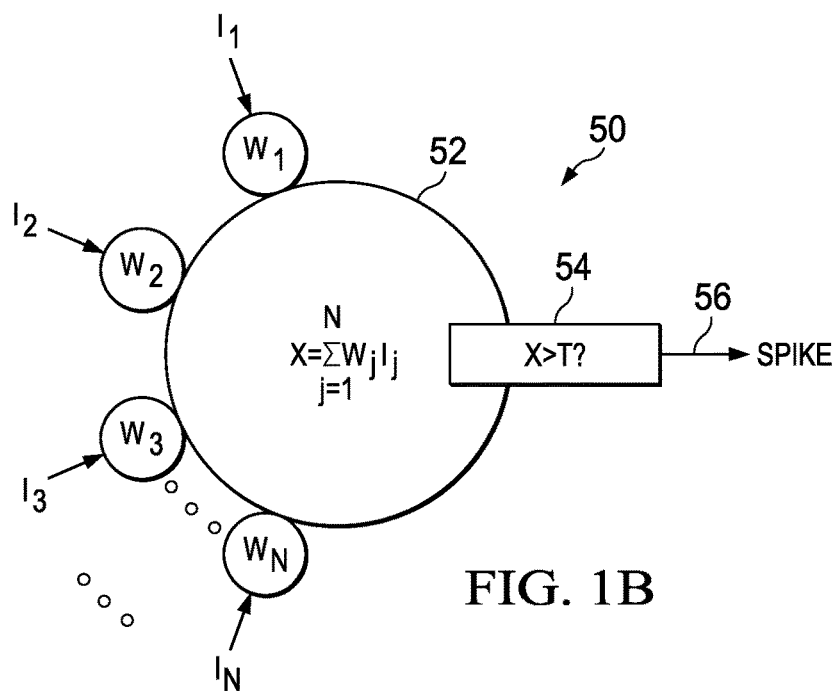
FIG. 1B is a mathematical representation of an electronic neuron.

FIG. 1B is a mathematical representation of an electronic neuron 50 that mimics the behavior of a biological neuron. Specifically, the electronic neuron 50 includes a nucleus 52 that has multiple inputs $I_1, I_2, \ldots, I_N$, and these inputs are associated with weights $W_1, W_2, \ldots, W_N$, respectively. The weight associated with an input dictates the impact that that input will have upon the neuron 50 and, more specifically, on the electronic neuron's mathematical equivalent of a biological membrane potential (which, for purposes of this discussion, will still be referred to as a membrane potential). The summation of the weighted inputs produces a membrane potential x, which causes a spike 56 if the potential x exceeds a threshold value T (numeral 54). Similar to Hebbian learning, repeated and persistent signals from a particular input to the electronic neuron 50 that causes the neuron to spike results in a shift in the magnitudes of weights $W_1, W_2, \ldots W_N$ to increase the weight associated with that particular input.

Figure 1C:
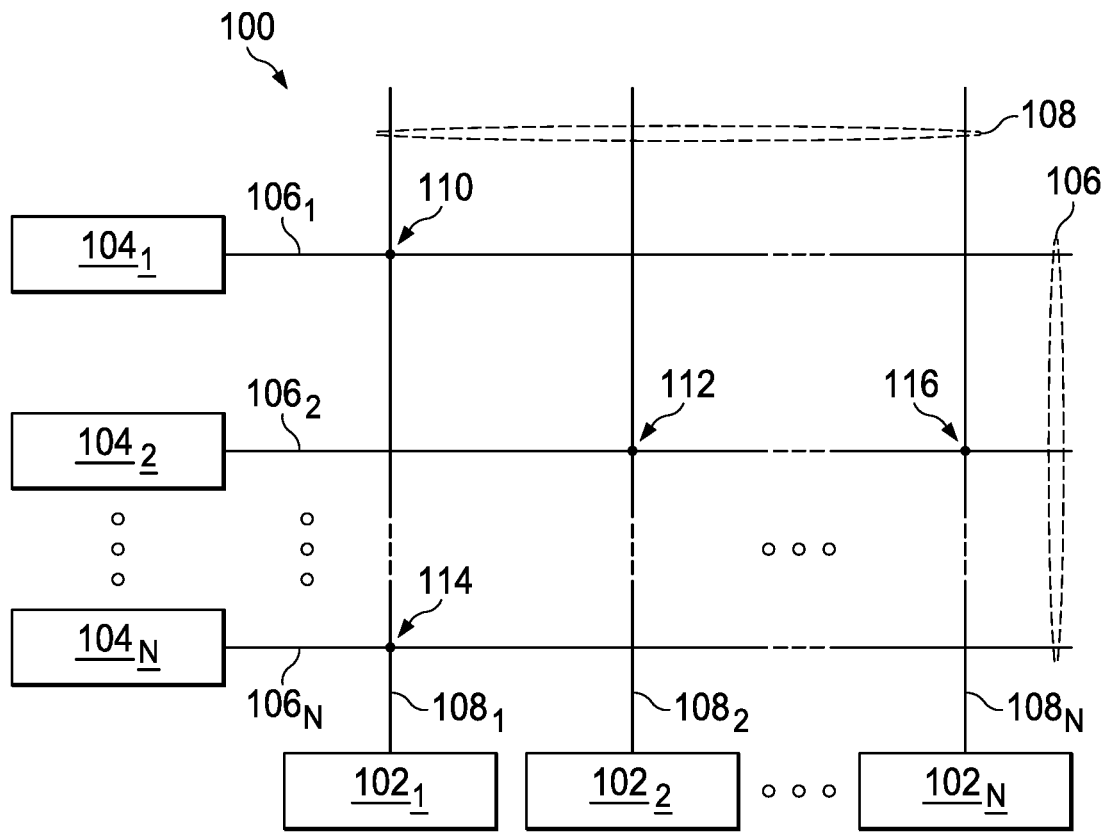
FIG. 1C is a schematic diagram of a neurosynaptic tile for use in a cognitive computer.

FIG. 1C is a schematic diagram of a neurosynaptic tile 100 for use in a cognitive computer. The neurosynaptic tile 100 includes a plurality of electronic neurons $102_1, 102_2, \ldots, 102_N$. The tile 100 further includes a plurality of electronic neurons $104_1, 104_2, \ldots, 104_N$. Each of the neurons $104_1, 104_2, \ldots, 104_N$ couples to an axon $106_1, 106_2, \ldots, 106_N$ (generally indicated by numeral 106), respectively. Similarly, each of the neurons $102_1, 102_2, \ldots, 102_N$ couples to a dendrite $108_1, 108_2, \ldots, 108_N$ (generally indicated by numeral 108), respectively. The axons 106 and dendrites 108 couple to each other in predetermined locations. For example, axon $106_1$ couples to dendrite $108_1$ at an electronic synapse 110; axon $106_2$ couples to dendrites $108_2, 108_N$ at synapses 112, 116, respectively; and axon $106_N$ couples to dendrite $108_1$ at synapse 114. In operation, when any of the membrane potentials of the electronic neurons $104_1, 104_2, \ldots, 104_N$ reaches or exceeds a threshold value, that neuron(s) fires on the corresponding axon(s) 106. The dendrites 108 to which the firing axons 106 couple receive the spikes and provide them to the neurons $102_1, 102_2, \ldots, 102_N$.

As explained above with respect to FIG. 1B, an electronic neuron may ascribe different weights to each input provided to that neuron. The same is true for the electronic neurons $102_1, 102_2, \ldots, 102_N$ and $104_1, 104_2, \ldots, 104_N$. Thus, for example, the dendrite $108_1$, which corresponds to electronic neuron $102_1$, couples to axons $106_1, 106_N$ at synapses 110, 114, respectively, and the electronic neuron $102_1$ ascribes different weights to the inputs from dendrites $106_1$ and $106_N$. If a greater weight is ascribed to dendrite $106_1$, the excitatory or inhibitory signal provided by that dendrite receives greater consideration toward the calculation of the membrane potential of the neuron $102_1$. Similarly, if a greater weight is ascribed to dendrite $106_N$, the excitatory or inhibitory signal provided by that dendrite receives greater consideration toward the calculation of the membrane potential of the neuron $102_1$. If the summation of the weighted signals received from the dendrites $106_1$ and $106_N$ exceeds the threshold of the neuron $102_1$, the neuron $102_1$ spikes on its axon (not specifically shown). In this way—by strengthening some electronic synapses and weakening others through the adjustment of input weights—these neurons implement an electronic version of STDP.

Figure 1D:
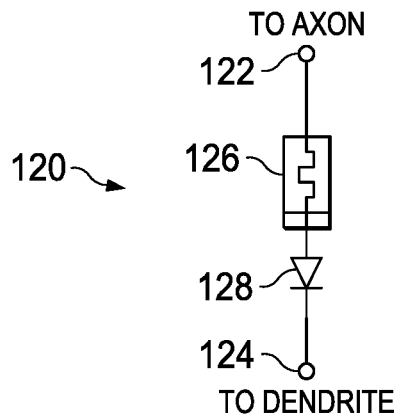
FIG. 1D is a schematic diagram of a circuit that embodies an electronic synapse.

FIG. 1D is a schematic diagram of a circuit that embodies an electronic synapse, such as the electronic synapses 110, 112, 114, 116 shown in FIG. 1C. Specifically, the electronic synapse 120 in FIG. 1D includes a node 122 that couples to an axon, a node 124 that couples to a dendrite, and a memristor 126 to store data. An optional access or control device 128 (e.g., a PN diode or field effect transistor (FET) wired as a diode, or some other element with a non-linear voltage-current response) may be coupled in series with the memristor 126 to prevent cross-talk during communication of neuronal spikes on adjacent axons or dendrites and to minimize leakage and power consumption. In some embodiments, a different memory element (e.g., static random access memory (SRAM), dynamic random access memory (DRAM), enhanced dynamic random access memory (EDRAM)) is used in lieu of the memristor 126.

Figure 1E:
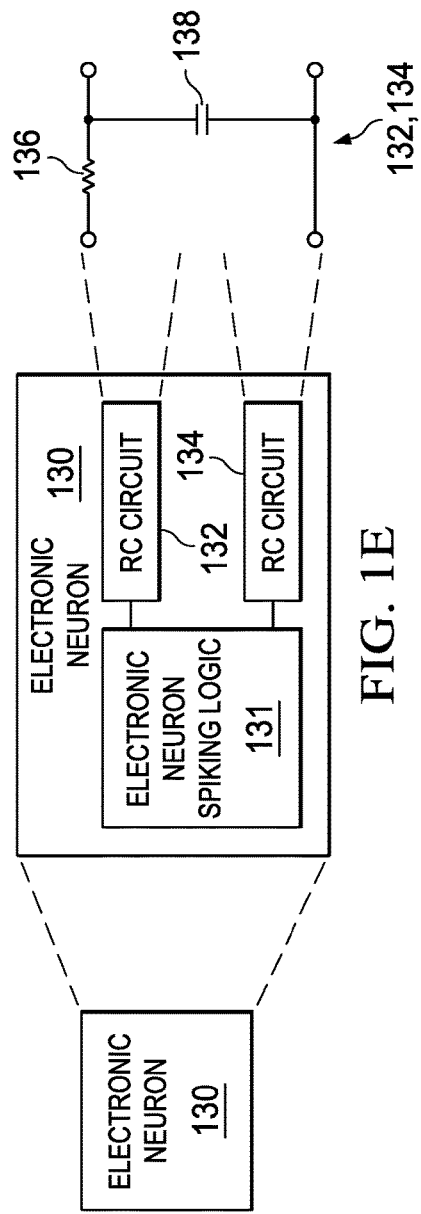
FIG. 1E is a schematic diagram of an electronic neuron.

FIG. 1E is a schematic diagram of an electronic neuron 130. Specifically, an electronic neuron 130 comprises electronic neuron spiking logic 131 and multiple resistor-capacitor (RC) circuits 132, 134. Although only two RC circuits are shown in the electronic neuron 130 of FIG. 1E, any suitable number of RC circuits may be used. Each RC circuit includes a resistor 136 and a capacitor 138 coupled as shown. When an electronic neuron fires (i.e., issues a spike) as a result of its membrane potential exceeding the neuron's firing threshold, the neuron maintains pre-synaptic and post-synaptic STDP variables. Each of these variables is a signal that decays with a relatively long time constant that is determined based on the values of the capacitor in a different one of the RCs 132, 134. Each of these signals may be sampled by determining the voltage across a corresponding RC circuit capacitor using, e.g., a current mirror. By sampling each of the variables, the length of time between the arrival of a pre-synaptic spike and a post-synaptic action potential following the spike arrival can be determined, as can the length of time between a post-synaptic action potential and a pre-synaptic spike arrival following the action potential. As explained above, the lengths of these times are used in STDP—that is, to effect synaptic potentiation and depression by adjusting synaptic weights, and thus to facilitate neurosynaptic learning.

Figure 1F:
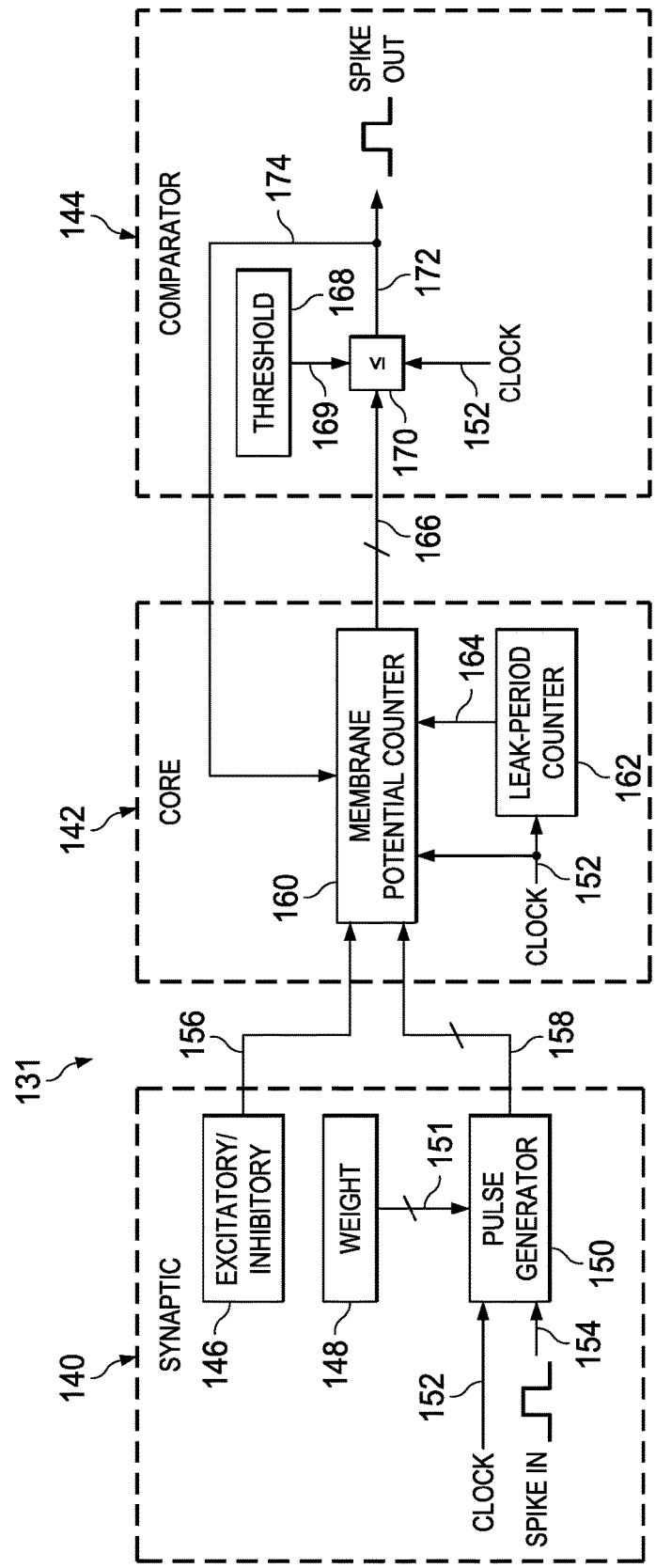
FIG. 1F is a block diagram of an electronic neuron spiking logic.

FIG. 1F is a block diagram of the electronic neuron spiking logic 131 of FIG. 1E. The logic 131 includes three conceptual components: a synaptic component 140, a neuronal core component 142, and a comparator component 144. Although FIG. 1F shows only one synaptic component 140, in practice, a separate synaptic component 140 is used for each synapse from which the electronic neuron receives input. Thus, in some embodiments the electronic neuron contains multiple synaptic components 140, one for each synapse from which that neuron receives input. In other embodiments, the synaptic component 140 forms a part of the synapse itself and not the electronic neuron. In either type of embodiment, the end result is the same.

Each synaptic component 140 includes an excitatory/inhibitory signal generator 146, a weight signal generator 148 associated with the corresponding synapse, and a pulse generator 150. The pulse generator 150 receives a clock signal 152 and a spike input signal 154, as well as a weight signal 151 from the weight signal generator 148. The pulse generator 150 uses its inputs to generate a weighted spike signal 158—for instance, the spike input signal 154 multiplied by the weight signal 151. The width of the weighted spike signal pulse reflects the magnitude of the weighted signal, and thus the magnitude that will contribute to or take away from the membrane potential of the electronic neuron. The weighted signal for the synapse corresponding to the synaptic component 140 is provided to the core component 142, and similar weighted signals are provided from synaptic components 140 corresponding to other synapses from which the electronic neuron receives input. For each weighted signal that the core 142 receives from a synaptic component 140, the core 142 also receives a signal 156 from the excitatory/inhibitory signal generator 146 indicating whether the weighted signal 158 is an excitatory (positive) or inhibitory (negative) signal. An excitatory signal pushes the membrane potential of the electronic neuron toward its action potential threshold, while an inhibitory signal pulls the membrane potential away from the threshold. As explained, the neurosynaptic learning process involves the adjustment of synaptic weights. Such weights can be adjusted by modifying the weight signal generator 148.

The core component 142 includes a membrane potential counter 160 and a leak-period counter 162. The membrane potential counter receives the weighted signal 158 and the excitatory/inhibitory signal 156, as well as the clock 152 and a leak signal 164 from the leak-period counter 162. The leak-period counter 162, in turn, receives only clock 152 as an input. In operation, the membrane potential counter 160 maintains a counter—initially set to zero—that is incremented when excitatory, weighted signals 158 are received from the synaptic component 140 and that is decremented when inhibitory, weighted signals 158 are received from the synaptic component 140. When no synapse pulse is applied to the core component 142, the leak period counter signal 164 causes the membrane potential counter 160 to gradually decrement at a predetermined, suitable rate. This action mimics the leak experienced in biological neurons during a period in which no excitatory or inhibitory signals are received by the neuron. The membrane potential counter 160 outputs a membrane potential signal 166 that reflects the present value of the counter 160. This membrane potential signal 166 is provided to the comparator component 144.

The comparator component 144 includes a threshold signal generator 168 and a comparator 170. The threshold generator 168 generates a threshold signal 169, which reflects the threshold at which the electronic neuron 130 generates a spike signal. The comparator 170 receives this threshold signal 169, along with the membrane potential signal 166 and the clock 152. If the membrane potential signal 166 reflects a counter value that is equal to or greater than the threshold signal 169, the comparator 170 generates a spike signal 172, which is subsequently output via an axon of the electronic neuron. As numeral 174 indicates, the spike signal is also provided to the membrane potential counter 160, which, upon receiving the spike signal, resets itself to zero.

Figure 2:
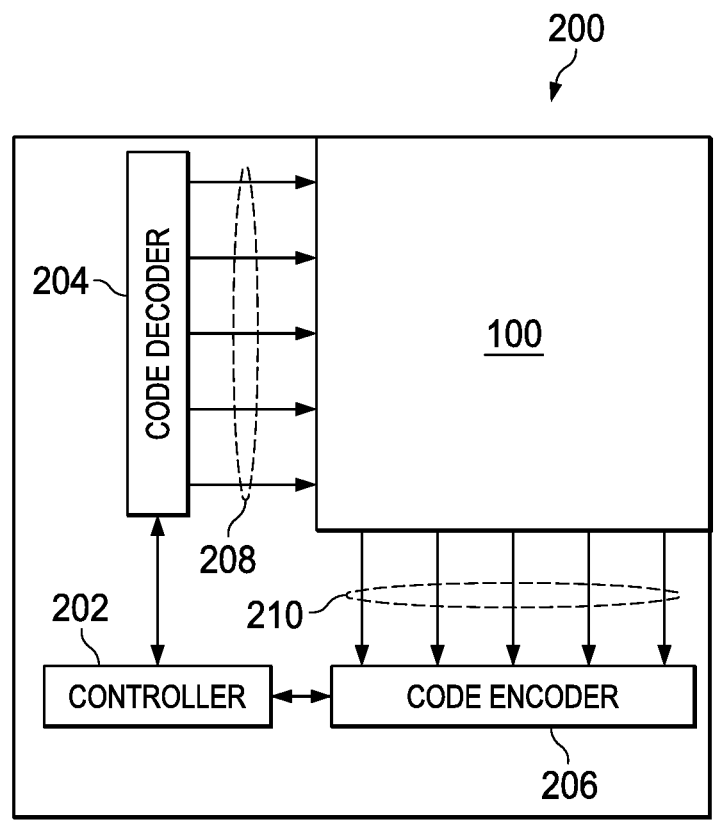
FIG. 2 is a schematic diagram of a neurosynaptic core for use in a cognitive computer.

FIG. 2 is a schematic diagram of a neurosynaptic core 200 for use in a cognitive computer. The core 200 includes a neurosynaptic tile 100, a controller 202, a decoder 204, an encoder 206, inputs 208, and outputs 210. Spike events generated by electronic neurons generally take the form of data packets. These packets, which may be received from neurons on other cores external to the core 200, are decoded by the decoder 204 (e.g., to interpret and remove packet headers) and passed as inputs 208 to the neurosynaptic tile 100. Similarly, packets generated by neurons within the neurosynaptic tile 100 that are destined for neurons outside the core 200 are passed as outputs 210 to the encoder 206 for encoding (e.g., to include a header with a destination address). The controller 202 controls the decoder 204 and encoder 206.

Figure 3:
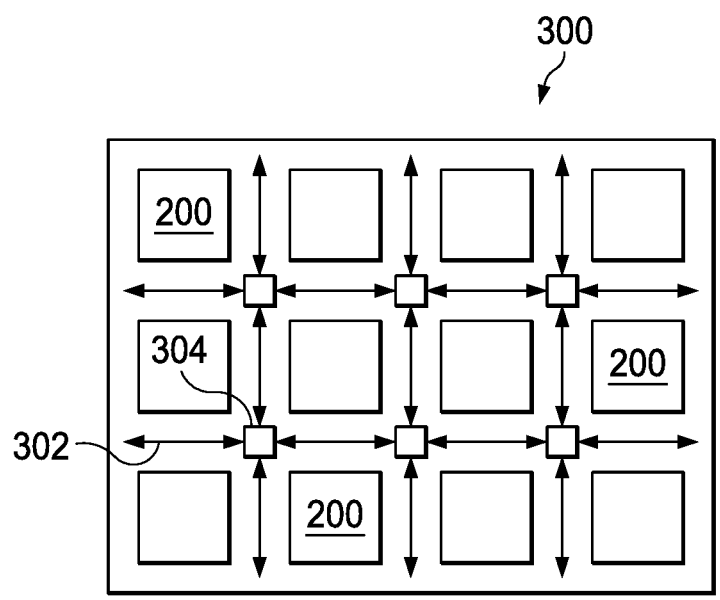
FIG. 3 is a schematic diagram of a multi-core neurosynaptic chip for use in a cognitive computer.

FIG. 3 is a schematic diagram of a multi-core neurosynaptic chip 300 for use in a cognitive computer. The chip 300 includes a plurality of neurosynaptic cores 200, such as the core 200 described with respect to FIG. 2. The cores 200 couple to each other via electrical connections (e.g., conductive traces). The chip 300 may include any suitable number of cores—for example, 4,096 or more cores on a single chip, with each core containing millions of electronic synapses. The chip 300 also contains a plurality of intrachip spike routers 304 that couple to a routing fabric 302. The cores 200 communicate with each other via the routers 304 and the fabric 302, using the aforementioned encapsulated, encoded packets to facilitate routing between cores and specific neurons within the cores.

Figure 4:
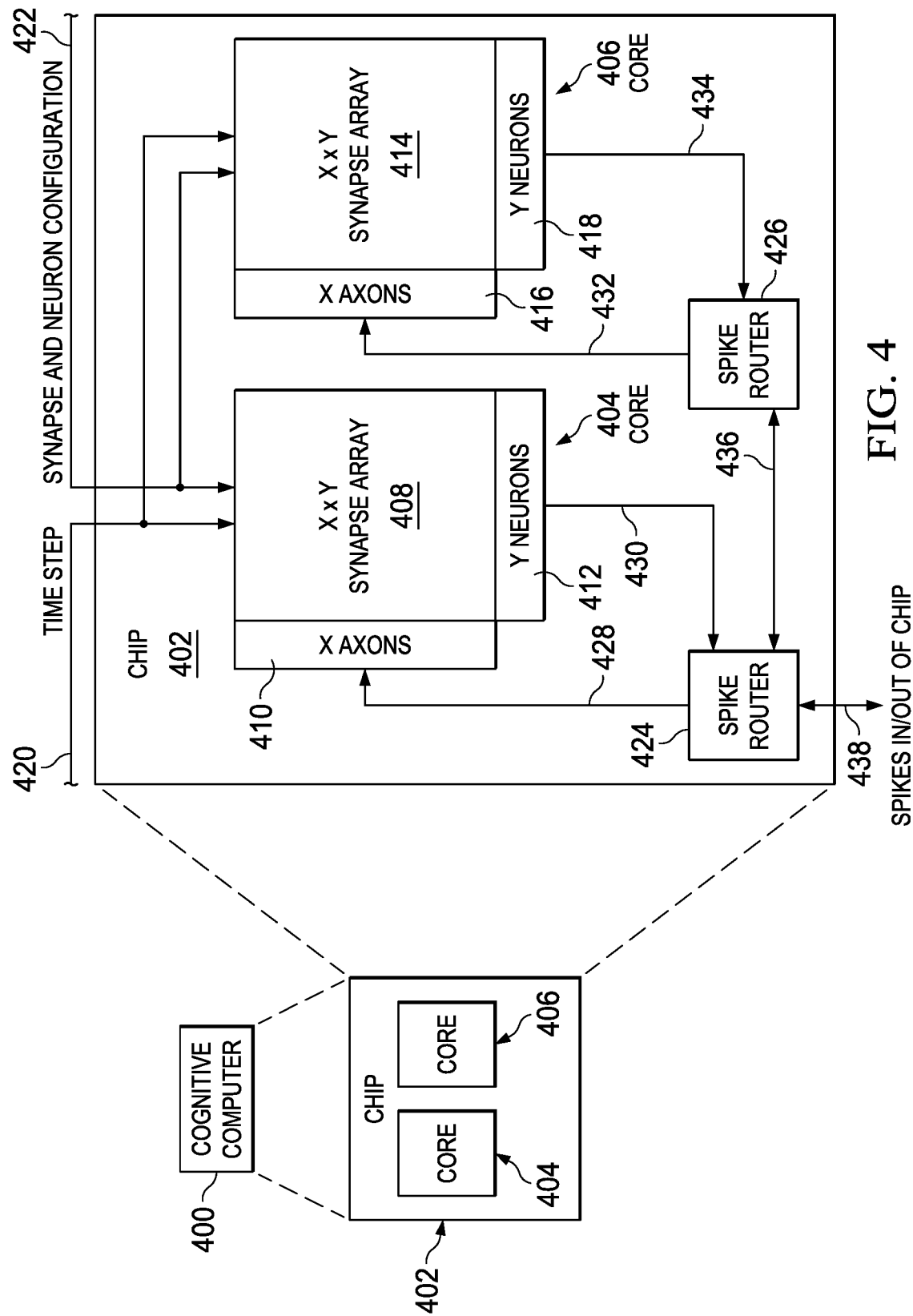
FIG. 4 is a detailed schematic diagram of a dual-core neurosynaptic chip for use in a cognitive computer.

FIG. 4 is a detailed schematic diagram of a dual-core neurosynaptic chip 402 for use in a cognitive computer 400. Specifically, a cognitive computer may include any suitable number of neurosynaptic chips 402, and each of these neurosynaptic chips 402 may include any suitable number of neurosynaptic cores, as previously explained. In the example of FIG. 4, the neurosynaptic chip 402 is a dual-core chip containing neurosynaptic cores 404, 406. The core 404 includes a synapse array 408 that includes a plurality of synapses that couple various axons 410 to dendrites. In some embodiments, axons 410 receive spikes from neurons directly coupled to the axons 410 and included on the core 404 (not specifically shown in FIG. 4, but an illustrative embodiment is shown in FIG. 1). In other embodiments, axons 410 are extensions of neurons located off of the core 404 (e.g., elsewhere on the chip 402, or on a different chip). In embodiments where the axons 410 couple directly to on-core neurons (e.g., as shown in FIG. 1), the spike router 424 provides spikes directly to the neurons' dendrites. In embodiments where the axons 410 are extensions of off-core neurons, the spike router 424 provides spikes from those neurons to the axons 410. Although a multitude of variations of such embodiments are possible, for brevity, FIG. 4 shows only an array of axons 410.

The synapse array 408 also couples to neurons 412. The neurons 412 may be a single-row, multiple-column array of neurons, or, alternatively, the neurons 412 may be a multiple-row-, multiple-column array of neurons. In either case, dendrites of the neurons 412 couple to axons 410 in the synapse array 408, thus facilitating the transfer of spikes from the axons 410 to the neurons 412 via dendrites in the synapse array 408. The spike router 424 receives spikes from off-core sources, such as the core 406 or off-chip neurons. The spike router 424 uses spike packet headers to route the spikes to the appropriate neurons 412 (or, in some embodiments, on-core neurons directly coupled to axons 410). In either case, bus 428 provides data communication between the spike router 424 and the core 404. Similarly, neurons 412 output spikes on their axons and bus 430 provides the spikes to the spike router 424. The core 406 is similar or identical to the core 404. Specifically, the core 406 contains axons 416, neurons 418, and a synapse array 414. The axons 416 couple to a spike router 426 via bus 432, and neurons 418 couple to the spike router 426 via bus 434. The functionality of the core 406 is similar or identical to that of the core 404 and thus is not described. A bus 436 couples the spike routers 424, 426 to facilitate spike routing between the cores 404, 406. A bus 438 facilitates the communication of spikes on and off of the chip 402. The architectures shown in FIGS. 1-4 (e.g., the TRUENORTH® architecture by IBM®) are non-limiting; other architectural configurations are contemplated and included within the scope of the disclosure.

Various types of software may be written for use in cognitive computers. One programming methodology is described below, but the scope of disclosure is not limited to this particular methodology. Any suitable, known software architecture for programming neurosynaptic processing logic is contemplated and intended to fall within the scope of the disclosure. The software architecture described herein entails the creation and use of programs that are complete specifications of networks of neurosynaptic cores, along with their external inputs and outputs. As the number of cores grows, creating a program that completely specifies the network of electronic neurons, axons, dendrites, synapses, spike routers, buses, etc. becomes increasingly difficult. Accordingly, a modular approach may be used, in which a network of cores and/or neurons encapsulates multiple sub-networks of cores and/or neurons; each of the sub-networks encapsulates additional sub-networks of cores and/or neurons, and so forth. In some embodiments, the CORELET® programming language, library and development environment by IBM® may be used to develop such modular programs.

Figure 5:
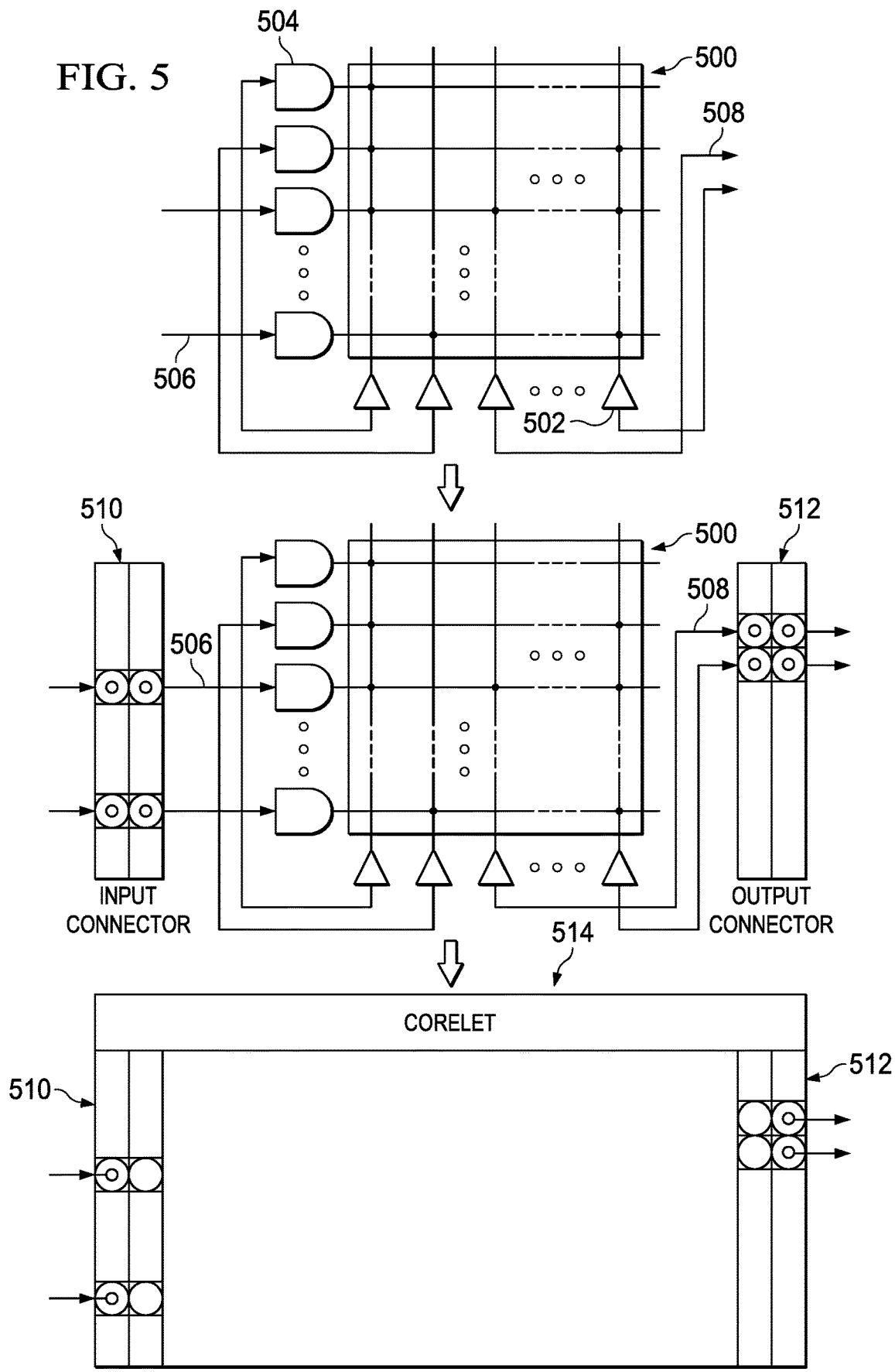
FIGS. 5 and 6 are conceptual diagrams of scalable corelets used for programming neurosynaptic processing logic.
Figure 6:
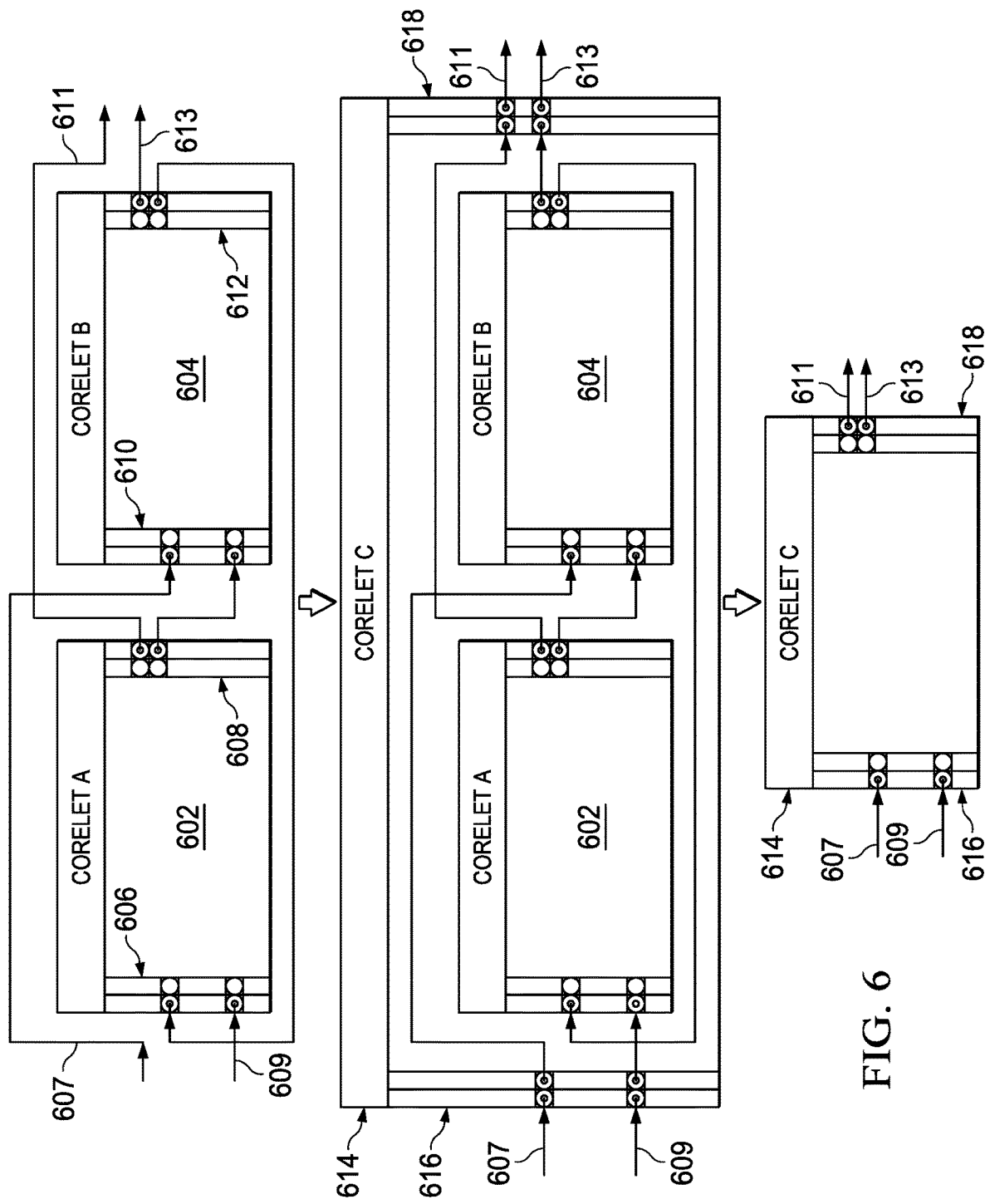

FIGS. 5 and 6 are conceptual diagrams illustrating the modular nature of the CORELET® programming architecture. FIG. 5 contains three panels. The first panel illustrates a neurosynaptic tile 500 containing a plurality of neurons 502 and axons 504, similar to the neurosynaptic architecture shown in FIG. 4. As shown, some of the neurons' outputs couple to the axons' inputs. However, inputs to other axons 504 are received from outside the tile 500, as numeral 506 indicates. Similarly, outputs from other neurons 502 are provided outside of the tile 500, as numeral 508 indicates. The second panel in FIG. 5 illustrates the initial step in the encapsulation of a tile into a corelet—that is, an abstraction that represents a program (for a neurosynaptic processing logic) that only exposes external inputs and outputs while encapsulating all other details into a "black box." Thus, as shown in the second panel, the only inputs to the tile 500 are inputs 506 to some of the axons 504, and the only outputs from the tile 500 are outputs 508 from some of the neurons 502. The inputs 506 couple to an input connector 510, and the outputs couple to an output connector 512. The third panel in FIG. 5 shows the completed corelet 514, with only the input connector 510 and output connector 512 being exposed, and with the remainder of the tile 500 having been encapsulated into the corelet 514. The completed corelet 514 constitutes a single building block of the CORELET® modular architecture; the corelet 514 may be grouped with one or more other corelets to form a larger corelet; in turn, that larger corelet may be grouped with one or more other larger corelets to form an even larger corelet, and so forth.

FIG. 6 includes three panels illustrating such encapsulation of multiple sub-corelets into a larger corelet. Specifically, the first panel includes corelets 602 and 604. Corelet 602 includes an input connector 606 and output connector 608. The remainder of the contents of the corelet 602 do not couple to circuitry outside of the corelet 602 and thus are not specifically shown as being coupled to the input connector 606 or the output connector 608. Similarly, corelet 604 includes an input connector 610 and an output connector 612. Certain inputs to and outputs from the corelets 602, 604 couple to each other, while other such inputs and outputs do not (i.e., inputs 607, 609 are not received from either corelet 602, 604, and outputs 611, 613 are not provided to either corelet 602 or 604). Thus, as shown in the second and third panels of FIG. 6, when the corelets 602, 604 are grouped into a single, larger corelet 614, only inputs 607, 609 are exposed on the input connector 616, and only outputs 611, 613 are exposed on the output connector 618. The remaining contents of the corelet 614 are encapsulated. As explained, one purpose of encapsulating neurosynaptic processing logic into corelets and sub-corelets is to organize the processing logic in a modular way that facilitates the creation of CORELET® programs, since such programs are complete specifications of networks of neurosynaptic cores. Although FIGS. 5 and 6 demonstrate the modular nature of the CORELET® software architecture, the CORELET® syntax itself is known and is not described here. Cognitive computing software systems other than CORELET® also may be used in conjunction with the hardware described herein or with any other suitable cognitive computing hardware. All such variations and combinations of potentially applicable cognitive computing hardware and software are contemplated and may be used to implement the oilfield operations enhancement techniques described herein.

The remainder of this disclosure describes the use of hardware and software cognitive computing technology to facilitate the enhancement of oilfield operations. As explained above, any suitable cognitive computing hardware or software technology may be used to implement such techniques. This cognitive computing technology may include none, some or all of the hardware and software architectures described above. For example, the oilfield operations enhancement techniques described below may be implemented using the CORELET® programming language or any other software language used in conjunctive with cognitive computers. The foregoing architectural descriptions, however, are non-limiting. Other hardware and software architectures may be used in lieu of, or to complement, any of the foregoing technologies. Any and all such variations are included within the scope of the disclosure.

Figure 7:
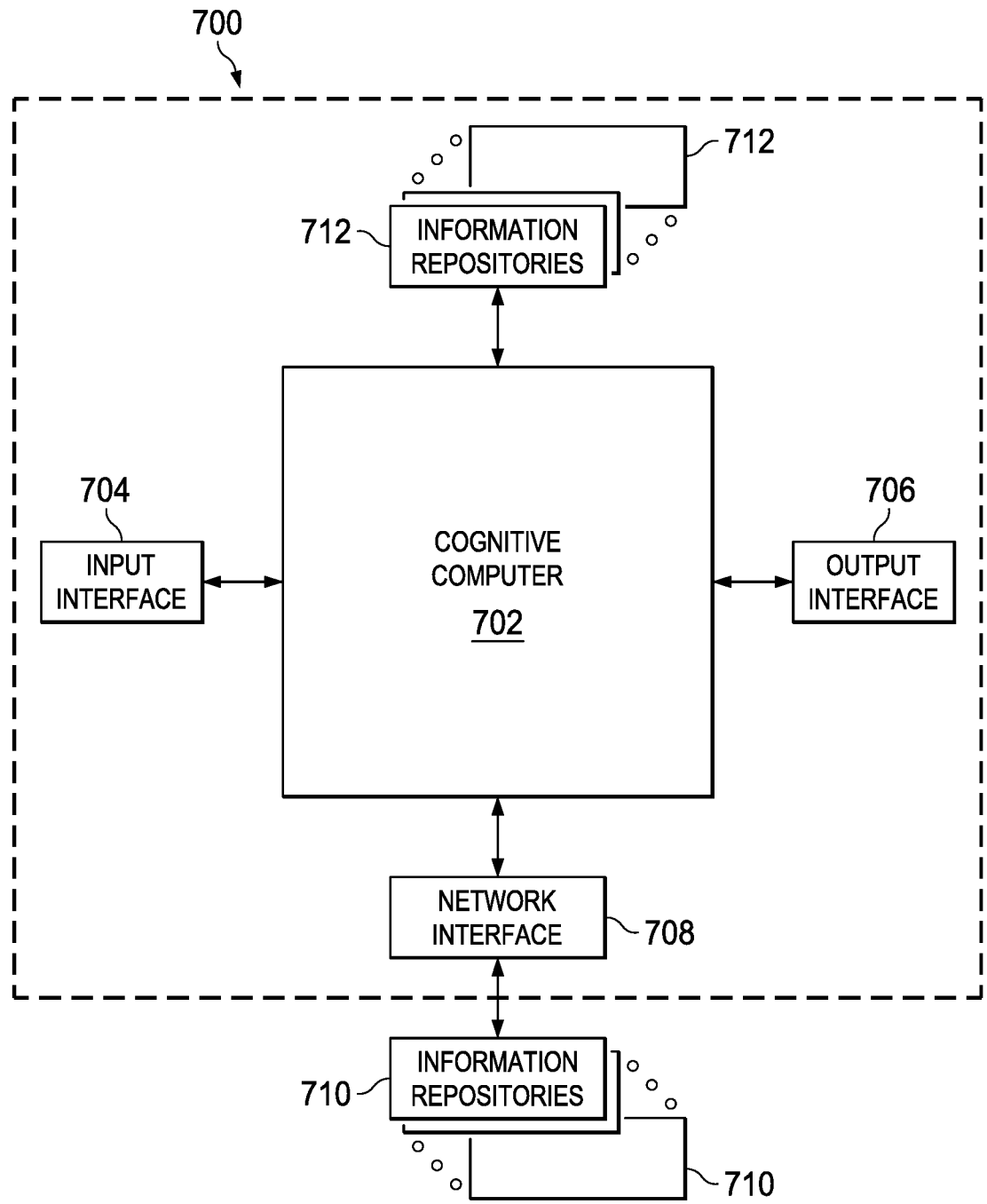
FIG. 7 is a block diagram of a cognitive computing system that has access to multiple information repositories.

FIG. 7 is a block diagram of a cognitive computing system 700 that has access to multiple information repositories. Specifically, the cognitive computing system 700 includes a cognitive computer 702 (i.e., any suitable computer that includes neurosynaptic processing logic and cognitive algorithm-based software, such as those described above) coupled to an input interface 704, an output interface 706, a network interface 708 and one or more local information repositories 712. In at least some embodiments, the input interface 704 is any suitable input device(s), such as a keyboard, mouse, touch screen, microphone, video camera, or one or more wearable devices (e.g., augmented reality device such as GOOGLE GLASS®). Other input devices are contemplated. The output interface 706 may include one or more of a display and an audio output device. Other output devices are contemplated. The network interface 708 is, for example, a network adapter or other suitable interface logic that enables communication between the cognitive computer 702 and any device not directly coupled to the cognitive computer 702. The local information repositories 712 include, without limitation, thumb drives, compact discs, Bluetooth devices, and any other device that can couple directly to the cognitive computer 702 such as by universal serial bus (USB) cable or high definition multimedia interface (HDMI) cable.

The cognitive computer 702 communicates with any number of remote information repositories 710 via the network interface 708. The quantity and types of such information repositories 710 may vary widely, and may include, without limitation, other cognitive computers; databases; distributed databases; sources that provide real-time data pertaining to oil and gas operations, such as drilling, fracturing, cementing, or seismic operations; servers; other personal computers; mobile phones and smart phones; websites and generally any resource(s) available via the Internet, World Wide Web, or a local network connection such as a virtual private network (VPN); cloud-based storage; libraries; and company-specific, proprietary, or confidential data. Any other suitable source of information with which the cognitive computer 702 can communicate is included within the scope of disclosure as a potential information repository 710. The software stored on the cognitive computer 702 is probabilistic (i.e., non-deterministic) in nature, meaning that its behavior is guided by probabilistic determinations as to possible events that may occur in the drilling environment being analyzed.

Figure 8:
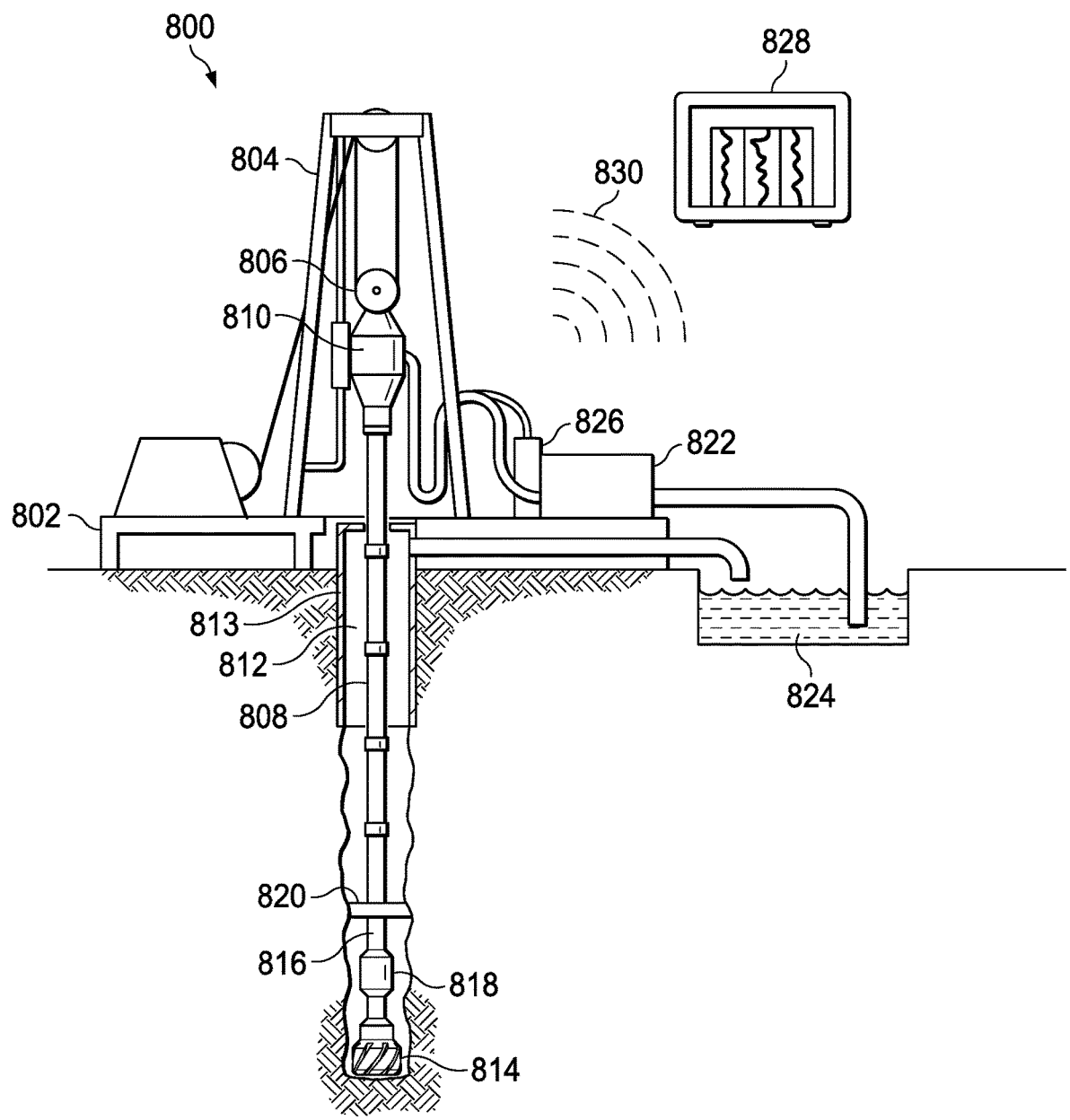
FIG. 8 is a schematic diagram of drilling equipment drilling a well.

FIG. 8 is a depiction of a drilling environment 800 that may be monitored by a cognitive computer according to the techniques described herein. The drilling environment 800 comprises a drilling platform 802 that supports a derrick 804 having a traveling block 806 for raising and lowering a drill string 808. A top-drive motor 810 supports and turns the drill string 808 as it is lowered into a borehole 812. The drill string's rotation, alone or in combination with the operation of a downhole motor, drives the drill bit 814 to extend the borehole 812. The drill bit 814 is one component of a bottomhole assembly (BHA) 116 that may further include a rotary steering system (RSS) 818 and stabilizer 820 (or some other form of steering assembly) along with drill collars and logging instruments. A pump 822 circulates drilling fluid through a feed pipe to the top drive 810, downhole through the interior of drill string 808, through orifices in the drill bit 814, back to the surface via an annulus around the drill string 808, and into a retention pit 824. The drilling fluid transports formation samples—i.e., drill cuttings—from the borehole 812 into the retention pit 824 and aids in maintaining the integrity of the borehole. Formation samples may be extracted from the drilling fluid at any suitable time and location, such as from the retention pit 824. The formation samples may then be analyzed at a suitable surface-level laboratory or other facility (not specifically shown). While drilling, an upper portion of the borehole 812 may be stabilized with a casing string 813 while a lower portion of the borehole 812 remains open (uncased). Receivers used to implement the monitoring techniques described herein may be mounted on such a casing string 813, as described below.

The drill collars in the BHA 816 are typically thick-walled steel pipe sections that provide weight and rigidity for the drilling process. The thick walls are also convenient sites for installing transmitters, receivers and logging instruments that measure downhole conditions, various drilling parameters, and characteristics of the formations penetrated by the borehole. The BHA 816 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors in accordance with commands received from the surface, and it provides a stream of telemetry data to the surface as needed to communicate relevant measurements and status information. A corresponding telemetry receiver and transmitter is located on or near the drilling platform 802 to complete the telemetry link. One type of telemetry link is based on modulating the flow of drilling fluid to create pressure pulses that propagate along the drill string ("mud-pulse telemetry or MPT"), but other known telemetry techniques are suitable, such as electromagnetic and acoustic telemetry. At least some of the data obtained by the control sub may be stored in memory for later retrieval, e.g., when the BHA 816 physically returns to the surface.

A surface interface 826 serves as a hub for communicating via the telemetry link and for communicating with the various sensors and control mechanisms on the platform 802. A data processing unit (shown in FIG. 8 as a tablet computer 828) communicates with the surface interface 826 via a wired or wireless link 830, collecting and processing measurement data (e.g., fiber optic cable optical signals) to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation. The data processing unit may also contain storage to store, e.g., data received from tools in the BHA 816 via electromagnetic or acoustic telemetry or any other suitable communication technique. The scope of disclosure is not limited to these particular examples of data processing units. The tablet computer 828 serves as a liaison between the drilling environment 800 and a cognitive computer (e.g., the cognitive computer 702 in FIG. 7) performing the techniques described herein. For instance, it provides the cognitive computer with drilling operations measurements obtained from various equipment depicted in FIG. 8, and, similarly, it enables the cognitive computer to control the various equipment depicted in FIG. 8. The scope of disclosure, however, is not limited to the particular equipment depicted in FIG. 8. In general, the cognitive computer is able to communicate with and thus control and receive data from any type of equipment that may be used in a drilling environment.

Figure 9:
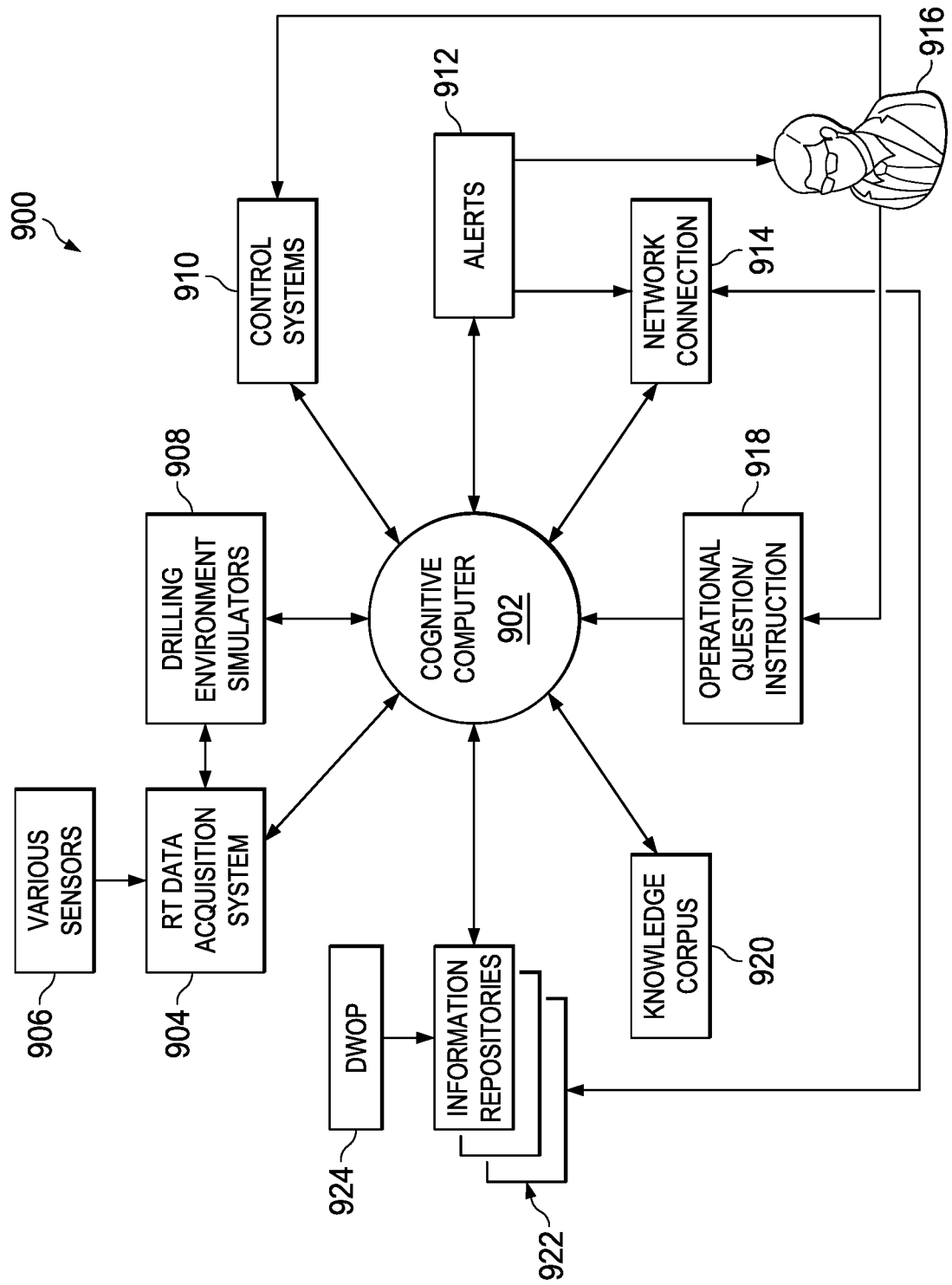
FIG. 9 is a conceptual block diagram of a cognitive computing system used to enhance drilling operations.

FIG. 9 is a conceptual block diagram of a cognitive computing system used to enhance drilling operations. Specifically, the cognitive computing system 900 comprises a cognitive computer 902 (such as the cognitive computer and associated equipment described with respect to FIGS. 1A-7); a real-time (RT) data acquisition system (DAQ) 904 coupled to the cognitive computer 902; various drilling environment sensors 906 coupled to the RT DAQ 904; drilling environment simulators 908 to which the cognitive computer 902 has access and that may optionally interact directly with the RT DAQ 904; control systems 910 that couple to the cognitive computer 902; drilling operations alerts 912 generated by the cognitive computer 902; a network (e.g., Internet/intranet) 914 that couples to the cognitive computer 902 and that can receive alerts 912; a human user (or, optionally, a separate cognitive computer) 916 who can receive alerts 912 and manipulate control systems 910, and who further can provide operational/drilling questions or instructions 918 to the cognitive computer 902; a knowledge corpus 920 (i.e., an information repository) coupled to the cognitive computer 902 and comprising various resources that are local to the cognitive computer 902 (as opposed to a remotely-located repository accessible to the cognitive computer 902 only via a network); one or more information repositories 922 accessible to the cognitive computer 902 and to the network 914 and containing various resources; and a drill-well on paper (DWOP) 924 that is provided to or present in at least one of the information repositories 922. The scope of disclosure is not limited to the specific component connections shown in FIG. 9. For example (and without limitation), although the network 914 is not specifically depicted as being connected to the RT DAQ 904, in at least some embodiments, the RT DAQ 904 can access the network 914 and one or more other components via the network 914.

The RT DAQ 904 generally is a computer application (and, in at least some embodiments, includes the hardware on which the application runs) that receives data, either from various sensors 906 or from external software systems such as simulators 908, and it disseminates this information to other systems. The RT DAQ 904 may also store some or all such information in database stores, either on the RT DAQ 904 itself or in any other appropriate location. Thus, the RT DAQ 904 essentially serves as a data manager. In some embodiments, the RT DAQ 904 communicates with or is part of a computer physically located in the drilling environment being analyzed (e.g., the computer 828 of FIG. 8).

The various sensors 906 include information collection devices of any type that may be used in a drilling environment. For example and without limitation, such sensors 906 may include different types of transducers (and similar devices) that measure some physical property in a drilling operation, such as pressure sensors, density sensors, etc. These sensors 906 generate data to be transmitted to the RT DAQ 904. The sensors 906 are not limited to devices that measure quantifiable parameters; on the contrary, they may include subjective, non-quantifiable information such as video and audio, which, in turn, can be interpreted by a properly trained cognitive computer 902.

The drilling environment simulators 908 are analytical simulators that receive real-time data from the RT DAQ 904, perform calculations and simulations on that data, and write the results of the calculations and simulations back to the RT DAQ 904. Illustrative, non-limiting simulations may indicate the behavior of a drilling operation parameter based on one or more of weight on bit, drilling revolutions per minute, tooth wear, pump rate, planned well trajectory and rate of penetration In at least some embodiments, simulations may be performed based on drilling operations models. One example is a drilling optimization model, which describes the response of a particular drilling environment to a set of inputs or constraints. The drilling optimization model may describe how different drilling input parameters affect a single drilling output parameter, or the model may describe how such input parameters affect multiple output parameters. Such output parameters reflect the degree of drilling optimization and may include, without limitation, drill string integrity, debris removal, wellbore integrity, rate of penetration, and drilling costs. For example, a particular drilling optimization model may express the impact that input parameters such as weight on bit, drill bit revolutions per minute, tooth wear, and formation strength affect the rate of penetration. The model is thus usable to identify a particular set of these and other input parameters that produces an optimal rate of penetration. Many such drilling optimization models are well-known (e.g., Maurer; Galle and Woods; Bourgoyne and Young) and fall within the scope of disclosure. Such a model can be used to generate and execute a simulation based on real-time drilling operations measurements or other real-time data collected during a drilling operation.

Yet another example is the vibrational model, which models drill string vibrations. Drill string vibrations typically include axial vibration ("bit bounce"), torsional vibration ("stick/slip"), and lateral vibration ("bending"). Such vibrations are caused by load or displacement excitations, such as mass imbalance, misalignment and kinks or bends, the cutting action of the drill bit, stabilizer blades, mud motors (e.g., wobbling of the rotor within the stator), and friction between the drill string and borehole wall. Vibration can be damaging; thus, vibration models are used to avoid vibration to the extent possible. Such models include frequency-based models and time-based models. The frequency-based models determine the input operating parameters that mitigate the likelihood that the drill string bottomhole assembly (BHA) will vibrate at its natural frequency, since natural frequency vibration often results in vibration. The time-based models analyze how a drilling system changes over time by accounting for formation strength and friction along the borehole. The model can be used to identify the onset of forward and backward whirl as well as lateral and torsional vibration. Such models may be used to generate and execute simulations based on real-time information collected during the drilling process.

Useful drilling models upon which to base simulations also include torque-and-drag models. Drill string drag is the force required to move the drill string up or down inside the borehole. Torque is the force required to rotate the drill string about its axis. Excessive torque and drag can be caused by tight wellbore conditions, keyseats, differential sticking, sloughing hole, sliding wellbore friction and cuttings buildup. Torque-and-drag models help to identify the set of input parameters—such as length of horizontal sections of a well, weight to a liner-top packer, and rig equipment specifications for torque and hookload—that best mitigate excessive torque and drag.

The control systems 910 include one or more devices that are capable of controlling various equipment in the drilling environment being monitored and analyzed. Such control systems may include, for instance, the computer 828 depicted in FIG. 8 or specific drilling equipment that performs particular functions (e.g., equipment to increase or decrease the weight on bit, to steer or rotate drilling, to stop and start drilling, to collect various measurements, etc.). The control systems 910 communicably couple to the cognitive computer 902, thus enabling the cognitive computer 902 to control any and all drilling equipment that the control systems 910 are capable of controlling. In addition, the control systems 910 may be controlled directly by a user 916—for instance, in response to a recommendation or drilling operations alert 912 generated by the cognitive computer 902.

Drilling operations alerts 912 include any and all types of media through which the cognitive computer 902 may communicate with the user 916. These include, for example and without limitation, audio alerts, visual alerts, audiovisual alerts, and tactile alerts (e.g., vibration). In addition, the alerts may be delivered by the cognitive computer 902 (e.g., a display) or through a device (e.g., a mobile phone) controlled by or at least in communication with the cognitive computer 902.

The network 914 may be the Internet or an intranet and, more generally, is any type of network through which the cognitive computer 902 may send and/or receive information to or from another electronic device. In at least some embodiments, the cognitive computer 902 provides drilling operations alerts 912 to other devices via the network 914. The network 914 also communicably couples to at least some of the information repositories 922 and thus enables the cognitive computer 902 to obtain information from and/or provide information to those information repositories 922.

The information repositories 922 include any and all types of devices capable of storing data, and, more generally, they are places where information is kept. They may include, for example and without limitation, personal computers, servers, mobile devices, optical memory devices, libraries, databases of all types, and the like. These information repositories 922 store various types of resources, including and without limitation, real-time data specific to the drilling environment; historical data relating to the drilling environment; any and all data relevant to the ongoing operations of the drilling environment; journals; articles; books; white papers; reports; speech; web content, etc. The cognitive computer 902 may access at least some of the information repositories 922 via the network 914, although one or more of the information repositories 922 may be accessed in other ways. Included among the resources on the information repositories 922 is a drill-well on paper (DWOP) 924, which is generally defined as a plan that describes the drilling environment and that the cognitive computer 902 can use to intelligently and probabilistically determine the optimal manner in which to monitor the drilling environment. The knowledge corpus 920 includes one or more information repositories that, in turn, store a collection of information and resources locally to the cognitive computer 902 (for example, resources stored on the cognitive computer 902 itself).

Finally, the user 916—which, as explained, may be a human user or another cognitive computer—is able to submit operational questions or instructions 918 to the cognitive computer 902. The cognitive computer 902 leverages its neurosynaptic architecture to probabilistically answer such operational questions 918 or to appropriately respond to instructions 918. More generally, the user 916 is able to engage in a discussion with the cognitive computer 902, much in the same manner that two humans would engage in a discussion with each other. These discussions are described in greater detail below with respect to the flow diagram in FIG. 10.

Figure 10:
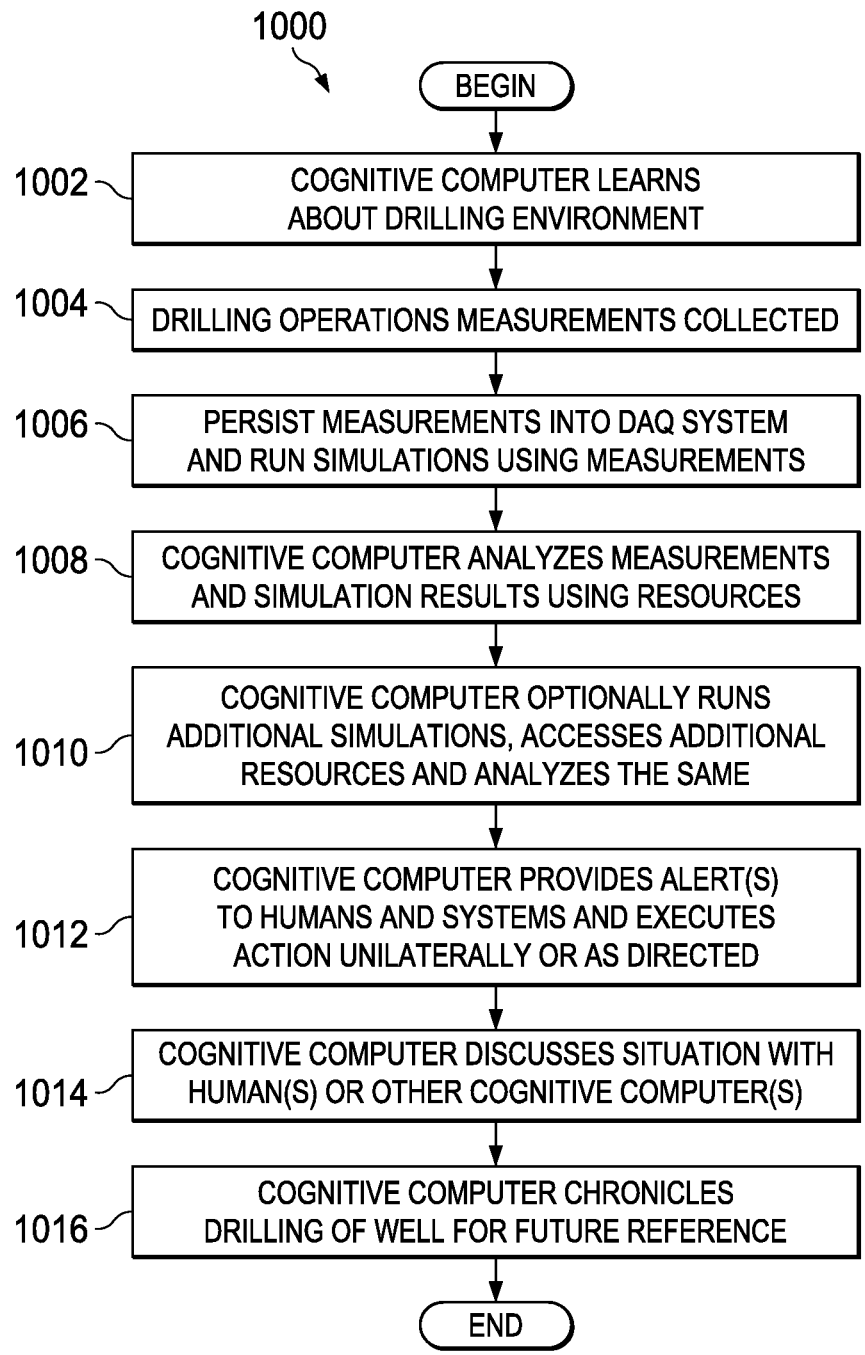
FIG. 10 is a flow diagram of a method used to enhance drilling operations.

FIG. 10 is a flow diagram of a method 1000 that may be implemented in the system 900 of FIG. 9. Referring to both FIGS. 9 and 10, the method 1000 begins with the cognitive computer 902 learning about the drilling environment to be monitored and analyzed (step 1002). As explained, the cognitive computer 902 may learn about the drilling environment through the DWOP 924, and it may gather additional information by engaging in a discussion with a user 916. The cognitive computer 902 may determine how to conduct such a discussion based at least in part on probabilistic analyses of information learned from prior such discussions as well as probabilistic analyses of the various resources it has available (e.g., via the information repositories 922 and/or knowledge corpus 920). Other ways of collecting information regarding the drilling environment are contemplated and included within the scope of the disclosure. For instance, instead of learning about the drilling environment by way of a DWOP 924, the cognitive computer 902 may be briefed with all necessary information by the user 916.

The method 1000 then includes the cognitive computer 902 collecting drilling operations measurements (step 1004). Measurements may be collected continuously or periodically and can include any and all types of data that may be measured or observed within the drilling environment. As explained above, the drilling operations measurements are not limited to objectively quantifiable data and may include, in some embodiments, non-quantifiable information such as audio or visual data. Drilling operations measurements are collected with the assistance of control systems 910, which may communicate with or include, for example, the computer 828 shown in FIG. 8. Like many of its actions, the cognitive computer 902 determines which types of drilling operations measurements to collect based on a probabilistic analysis of the various resources available to it, including prior drilling operations measurement collections. Non-limiting examples of real-time drilling operations measurements include rate of drill bit penetration; drill bit revolutions per minute; weight on bit; fluid pump rate; fluid rheology; physical properties of fluid; standpipe pressure; pressure while drilling; temperature while drilling; and pipe running speed. The scope of disclosure is not limited to collecting real-time measurements. On the contrary, historical data, including measurements of all suitable types, may be accessed from the RT DAQ 904, one or more information repositories 922, or the like and used by the cognitive computer 902 to perform the method 1000.

The method 1000 next includes persisting (e.g., permanently or semi-permanently storing) the measurements into the data acquisition system (e.g., the RT DAQ 904) and running one or more simulations using the collected real-time and/or historical measurements (step 1006). The specific types of drilling operations simulations 908 (e.g., hydraulics simulations) that are performed depends on the types of information that the cognitive computer 902 determines to be helpful in recognizing current drilling operations events, predicting future such events, and optimizing drilling operations performance. The simulations 908 that yield information that has historically been helpful in this regard or that at least may be helpful are the simulations that the cognitive computer 902 will most likely perform using real-time and/or historical drilling operations measurements.

The method 1000 next comprises the cognitive computer 902 analyzing the real-time and/or historical drilling operations measurements and drilling operations simulation results (step 1008). The measurements and simulation results preferably are probabilistically analyzed with the aid of any and all relevant resources accessed from the information repositories 922 and/or knowledge corpus 920. In performing this analysis, the cognitive computer 902 leverages its neurosynaptic architecture to determine, based on all relevant and available information, which drilling operations events are occurring and which drilling operations events are likely to occur. For example and without limitation, the cognitive computer 902 may look for potential warning signs such as unexpected influx, torque and drag issues, excessive cuttings build up, excessive drill string vibration, bit balling, lost circulation, wellbore pressure measurements exceeding prescribed parameters, equivalent circulating density, and the like. The cognitive computer 902 looks not just for potential events, but also for drilling operations parameters that may be adjusted to result in enhanced (e.g., more efficient) drilling operations.

In some cases, the cognitive computer's analysis of the information available to it leads the cognitive computer to conclude that additional information may be helpful in determining whether an alert should be generated or whether drilling parameters could be adjusted to improve performance. In such cases, the cognitive computer 902 may obtain additional data from the RT DAQ 904, run additional simulations, and/or access additional resources via the information repositories 922 and/or the knowledge corpus 920, and it may then analyze all obtained information to determine whether alerts and/or parameter modifications are necessary or helpful (step 1010). The cognitive computer 902 may perform step 1010 as many times as may be suitable and necessary.

Based on the probabilistic analyses it performs in steps 1008 and 1010, the cognitive computer 902 provides one or more drilling operations alerts to a user 916 (step 1012). As explained above, such alerts may be for currently occurring drilling operations events (e.g., an immediate safety issue) or for predicted events. The alerts may take any suitable form, including audio, visual, audiovisual, tactile, etc. and may be provided to the user 916 either directly by the cognitive computer 902 or by another electronic device in communications with the cognitive computer 902. In addition to or in lieu of such alerts, the cognitive computer 902 may provide various recommendations—for example, to address any drilling operations alert(s) or to adjust drilling operations parameters to enhance performance in the drilling environment (e.g., to change the weight on bit or to adjust chemical ratios in the drilling mud) (step 1012). Further, the cognitive computer 902 may offer the user 916 the option of executing one or more courses of action to address the computer's recommendations, and, upon the user's request, the cognitive computer 902 may execute such action(s) (step 1012). Alternatively, the cognitive computer 902 may unilaterally execute such action(s) without pre-approval by the user 916 (step 1012). Such actions may include, for instance, controlling a drilling operation by controlling pump rate in the drilling operation; controlling revolutions per minute in the drilling operation; controlling weight on bit in the drilling operation; controlling fluid properties (e.g., by adjusting the types and proportions of fluid additives) and controlling rate of penetration in the drilling operation. The scope of disclosure is not limited to these or any particular course(s) of action. Various other techniques for controlling a drilling operation are contemplated.

Optionally, the method 1000 includes a discussion between the cognitive computer 902 and user 916 regarding the drilling operations events, alerts and/or recommendations (step 1014). These discussions may take place before, during or after the step 1012. In some embodiments, during such discussions, the cognitive computer may generate—without human assistance—arguments for and against each of the recommendations and presents the recommendations and arguments to the user 916. Stated another way, these arguments are the "pros" and "cons" associated with each of the recommendations. The cognitive computer will have been trained to use facts and evidence to generate and support each of its arguments. The cognitive computer performs thorough, probabilistic analyses (including secondary and tertiary analyses) of all potential recommendations in light of the resources in its knowledge corpus 920 and other information repositories 922 and uses these analyses in intelligently formulating its fact-based arguments. The cognitive computer 902 may perform much of the same process to discuss drilling operations events and alerts. Based on all resources available to it, the cognitive computer 902 leverages its neurosynaptic architecture and probabilistic nature to answer questions about its recommendations, arguments, alerts, and events, as well as to ask its own questions and look for opportunities to make helpful observations or statements within the context of a discussion.

Finally, the method 1000 comprises the cognitive computer 902 storing all information used in the performance of steps 1002-1014 for future reference (step 1016). In addition, the cognitive computer 902 may observe the outcomes of actions taken in steps 1002-1014 and may store such observations. By storing such historical information in, e.g., the RT DAQ 904, one or more information repositories 922, the knowledge corpus 920, or some other storage device accessible via the network 914, the cognitive computer 902 has access to an ever-growing body of information that it may use to perform its probabilistic analyses. This growing body of data results in more accurate and reliable analyses and, thus, enhanced drilling operations performance. The method 1000 may be modified in any suitable manner. Steps may be added, removed, rearranged or otherwise modified as may be suitable.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

At least some embodiments include a cognitive computing system for enhancing drilling operations, comprising: neurosynaptic processing logic; and one or more information repositories accessible to the neurosynaptic processing logic, wherein the neurosynaptic processing logic performs a probabilistic analysis of one or more real-time drilling operations measurements, one or more resources obtained from said one or more information repositories, and one or more drilling operations simulations that account for said one or more real-time drilling operations measurements, wherein the neurosynaptic processing logic controls a drilling operation based at least in part on said probabilistic analysis. At least some of these embodiments may be supplemented using one or more of the following concepts, in any order and in any combination: wherein the real-time drilling operations measurements are selected from the group consisting of: rate of drill bit penetration; drill bit revolutions per minute; weight on bit; fluid pump rate; fluid rheology; physical properties of fluid; standpipe pressure; pressure while drilling; temperature while drilling; and pipe running speed; wherein the neurosynaptic processing logic generates a drilling operations alert based on the probabilistic analysis, said alert comprising a warning about unsafe drilling conditions; wherein the drilling operations alert includes a warning signal about a problem selected from the group consisting of: torque and drag problems; excessive cuttings build up; excessive drill string vibration; bit balling; lost circulations; unexpected influx; and equivalent circulating density; wherein the drilling operations alert comprises a proposed course of action to control the drilling operation; wherein the neurosynaptic processing logic unilaterally executes said proposed course of action; wherein the proposed course of action is selected from the group consisting of: controlling pump rate in the drilling operation; controlling revolutions per minute in the drilling operation; controlling weight on bit in the drilling operation; controlling drilling fluid properties; and controlling rate of penetration in the drilling operation; wherein the neurosynaptic processing logic discusses one or more of the following with a user or a cognitive computer: the drilling operations alert, the one or more drilling operations measurements, the one or more resources, or the one or more drilling operations simulations; wherein the neurosynaptic processing logic logs one or more of: the drilling operations alert, the one or more drilling operations measurements, the one or more resources, or the one or more drilling operations simulations; and wherein said one or more drilling operations simulations indicate behavior of a drilling operation parameter based on one or more of weight on bit, drilling revolutions per minute, tooth wear, pump rate, and rate of penetration.

At least some embodiments are directed to a cognitive computing system for enhancing drilling operations, comprising: neurosynaptic processing logic including multiple electronic neurons operating in parallel; input and output interfaces coupled to the neurosynaptic processing logic; and one or more information repositories accessible to the neurosynaptic processing logic, wherein the neurosynaptic processing logic: receives one or more real-time drilling operations measurements; accesses one or more resources from the one or more information repositories based on the drilling operations measurements; performs one or more drilling operations simulations using the one or more drilling operations measurements, the one or more resources, or both; generates a drilling operations alert based on a probabilistic analysis of said one or more real-time drilling operations measurements, said one or more resources, and said one or more drilling operations simulations, said drilling operations alert includes a proposed course of action; and executes the proposed course of action to control a drilling operation, wherein the neurosynaptic processing logic engages a user in a conversation about the alert, the proposed course of action, or both via the input and output interfaces. One or more of these embodiments may be supplemented using one or more of the following concepts, in any order and in any combination: wherein said one or more drilling operations simulations indicate behavior of a drilling operation parameter based on one or more of weight on bit, drilling revolutions per minute, tooth wear, pump rate, and rate of penetration; wherein the one or more real-time drilling operations measurements are selected from the group consisting of: rate of drill bit penetration; drill bit revolutions per minute; weight on bit; fluid pump rate; and pipe running speed; wherein the neurosynaptic processing logic automatically learns information and uses said learned information to perform said probabilistic analysis; wherein the drilling operations alert includes a warning signal about a problem selected from the group consisting of: torque and drag problems; excessive cuttings build up; excessive drill string vibration; bit balling; lost circulations; unexpected influx; and out-of-range wellbore pressure; and wherein the neurosynaptic processing logic executes said proposed course of action either unilaterally or upon command by a user.

At least some embodiments are directed to a method for enhancing drilling operations, comprising: receiving one or more real-time drilling operations measurements; accessing one or more resources based on the real-time drilling operations measurements; performing one or more drilling operations simulations using the one or more real-time drilling operations measurements, the one or more resources, or both; using neurosynaptic processing logic to perform a probabilistic analysis of said one or more real-time drilling operations measurements, said one or more resources, and said one or more drilling operations simulations; generating a drilling operations alert based on said probabilistic analysis; providing the drilling operations alert to a human, a computer, or both; and controlling a drilling operation in response to a command from the human, the computer, or both. One or more of these embodiments may be supplemented using one or more of the following concepts, in any order and in any combination: further comprising using the neurosynaptic processing logic to have a discussion with a human, a cognitive computer, or both regarding the drilling operations alert; further comprising using the neurosynaptic processing logic to execute a course of action based on said discussion; wherein the one or more drilling operations simulations indicate behavior of a drilling operation parameter based on one or more of weight on bit, drilling revolutions per minute, tooth wear, pump rate, planned well trajectory and rate of penetration.

What is claimed:

1. A cognitive computing system for enhancing drilling operations, comprising:
at least one processor having a neurosynaptic hardware architecture to execute neurosynaptic processing logic, the neurosynaptic hardware architecture comprising at least one neurosynaptic core having a neurosynaptic tile, a controller, a decoder, an encoder, inputs, and outputs, each neurosynaptic core communicating with another neurosynaptic core of the at least one neurosynaptic core via spike routers that couple to a routing fabric to send encapsulated, encoded packets; and
one or more information repositories accessible to the neurosynaptic processing logic,
wherein the at least one processor having the neurosynaptic hardware architecture performs a probabilistic analysis of one or more real-time drilling operations measurements, one or more resources obtained from said one or more information repositories, and one or more drilling operations simulations that account for said one or more real-time drilling operations measurements,
wherein the at least one processor having the neurosynaptic hardware architecture controls a drilling operation based at least in part on said probabilistic analysis.

2. The system of claim 1, wherein the real-time drilling operations measurements are selected from the group consisting of: rate of drill bit penetration; drill bit revolutions per minute; weight on bit; fluid pump rate; fluid rheology; physical properties of fluid; standpipe pressure; pressure while drilling; temperature while drilling; and pipe running speed.

3. The system of claim 1, wherein the at least one processor generates a drilling operations alert based on the probabilistic analysis, said alert comprising a warning about unsafe drilling conditions.

4. The system of claim 3, wherein the drilling operations alert includes a warning signal about a problem selected from the group consisting of: torque and drag problems; excessive cuttings build up; excessive drill string vibration; bit balling causing an issue; lost circulations; unexpected influx; and equivalent circulating density above a first particular level or below a second particular level.

5. The system of claim 3, wherein the drilling operations alert comprises a proposed course of action to control the drilling operation.

6. The system of claim 5, wherein the at least one processor having the neurosynaptic hardware architecture unilaterally executes said proposed course of action.

7. The system of claim 5, wherein the proposed course of action is selected from the group consisting of: controlling pump rate in the drilling operation; controlling revolutions per minute in the drilling operation; controlling weight on bit in the drilling operation; controlling drilling fluid properties; and controlling rate of penetration in the drilling operation.

8. The system of claim 1, wherein the at least one processor having the neurosynaptic hardware architecture sends one or more of the following to a user or a cognitive computer: a drilling operations alert, the one or more drilling operations measurements, the one or more resources, or the one or more drilling operations simulations.

9. The system of claim 1, wherein the at least one processor having the neurosynaptic hardware architecture logs one or more of: the drilling operations alert, the one or more drilling operations measurements, the one or more resources, or the one or more drilling operations simulations.

10. The system of claim 1, wherein said one or more drilling operations simulations indicate behavior of a drilling operation parameter based on one or more of weight on bit, drilling revolutions per minute, tooth wear, pump rate, and rate of penetration.

11. A cognitive computing system for enhancing drilling operations, comprising:
at least one processor having a neurosynaptic hardware architecture comprising at least one neurosynaptic core having a neurosynaptic tile, a controller, a decoder, an encoder, inputs, and outputs, each neurosynaptic core communicating with another neurosynaptic core of the at least one neurosynaptic core via spike routers that couple to a routing fabric to send encapsulated, encoded packets to execute neurosynaptic processing logic including multiple electronic neurons operating in parallel;
input and output interfaces coupled to the neurosynaptic processing logic; and
one or more information repositories accessible to the neurosynaptic processing logic,
wherein the at least one processor having the neurosynaptic hardware architecture receives one or more real-time drilling operations measurements;
accesses one or more resources from the one or more information repositories based on the drilling operations measurements;
performs one or more drilling operations simulations using the one or more drilling operations measurements, the one or more resources, or both;
generates a drilling operations alert based on a probabilistic analysis of said one or more real-time drilling operations measurements, said one or more resources, and said one or more drilling operations simulations, said drilling operations alert includes a proposed course of action; and
executes the proposed course of action to control a drilling operation,
wherein the at least one processor having the neurosynaptic hardware architecture sends to a user in a conversation about the alert, the proposed course of action, or both via the input and output interfaces.

12. The system of claim 11, wherein said one or more drilling operations simulations indicate behavior of a drilling operation parameter based on one or more of weight on bit, drilling revolutions per minute, tooth wear, pump rate, and rate of penetration.

13. The system of claim 11, wherein the one or more real-time drilling operations measurements are selected from the group consisting of: rate of drill bit penetration; drill bit revolutions per minute; weight on bit; fluid pump rate; and pipe running speed.

14. The system of claim 11, wherein the at least one processor having the neurosynaptic hardware architecture automatically learns information and uses said learned information to perform said probabilistic analysis.

15. The system of claim 11, wherein the drilling operations alert includes a warning signal about a problem selected from the group consisting of: torque and drag problems; excessive cuttings build up; excessive drill string vibration; bit balling causing an issue; lost circulations; unexpected influx; and out-of-range wellbore pressure.

16. The system of claim 11, wherein the at least one processor having the neurosynaptic hardware architecture executes said proposed course of action either unilaterally or upon command by the user.

17. A method for enhancing drilling operations, comprising:
- receiving, by at least one processor having a neurosynaptic hardware architecture comprising at least one neurosynaptic core having a neurosynaptic tile, a controller, a decoder, an encoder, inputs, and outputs, each neurosynaptic core communicating with another neurosynaptic core of the at least one neurosynaptic core via spike routers that couple to a routing fabric to send encapsulated, encoded packets, one or more real-time drilling operations measurements;
- accessing, by the at least one processor, one or more resources based on the real-time drilling operations measurements;
- performing, by the at least one processor, one or more drilling operations simulations using the one or more real-time drilling operations measurements, the one or more resources, or both;
- using neurosynaptic processing logic to perform a probabilistic analysis, by the at least one processor, of said one or more real-time drilling operations measurements, said one or more resources, and said one or more drilling operations simulations;
- generating, by the at least one processor, a drilling operations alert based on said probabilistic analysis;
- providing, by the at least one processor, the drilling operations alert to at least one of a human, and a computer; and
- controlling, by the at least one processor, a drilling operation in response to a command from at least one of the human, and the computer.

18. The method of claim 17, further comprising using the at least one processor having the neurosynaptic hardware architecture to send the drilling operations alert to at least one of the human and the computer.

19. The method of claim 18, further comprising using at least one processor having the neurosynaptic hardware architecture to execute a course of action based on the drilling operations alert.

20. The method of claim 17, wherein the one or more drilling operations simulations indicate behavior of a drilling operation parameter based on one or more of weight on bit, drilling revolutions per minute, tooth wear, pump rate, planned well trajectory, and rate of penetration.

* * * * *